United States Patent
Bruck et al.

(10) Patent No.: US 6,691,165 B1
(45) Date of Patent: Feb. 10, 2004

(54) DISTRIBUTED SERVER CLUSTER FOR CONTROLLING NETWORK TRAFFIC

(75) Inventors: Jehoshua Bruck, Pasadena, CA (US); Vasken Bohossian, Pasadena, CA (US); Chenggong Fan, Pasadena, CA (US); Paul LeMahieu, Pasadena, CA (US); Philip Love, Pasadena, CA (US)

(73) Assignee: RAINfinity, Inc., Mountain View, CA (US)

( * ) Notice: Subject to any disclaimer, the term of this patent is extended or adjusted under 35 U.S.C. 154(b) by 0 days.

(21) Appl. No.: 09/547,533

(22) Filed: Apr. 12, 2000

Related U.S. Application Data

(63) Continuation of application No. 09/437,637, filed on Nov. 10, 1999, now abandoned.
(60) Provisional application No. 60/128,872, filed on Apr. 12, 1999, and provisional application No. 60/107,827, filed on Nov. 10, 1998.

(51) Int. Cl.$^7$ .............................................. G06F 15/16
(52) U.S. Cl. ...................................... 709/227; 709/249
(58) Field of Search ........................ 709/207, 242–245, 709/311, 220–229, 249; 707/501.1; 340/2.4; 370/232, 351, 396, 397, 412

(56) References Cited

U.S. PATENT DOCUMENTS

| | | | |
|---|---|---|---|
| 5,341,477 A | 8/1994 | Pitkin et al. | 395/200 |
| 5,636,216 A | 6/1997 | Fox et al. | 370/402 |
| 5,729,681 A | 3/1998 | Aditya et al. | 395/200.1 |
| 5,774,660 A | 6/1998 | Brendel et al. | 395/200.31 |
| 5,774,668 A | 6/1998 | Choquier et al. | 395/200.53 |

(List continued on next page.)

FOREIGN PATENT DOCUMENTS

| WO | 9826559 | 6/1998 |
|---|---|---|
| WO | 9933227 | 7/1999 |

OTHER PUBLICATIONS

Goldszmidt, G. S., "Load management for scaling up internet services" IEEE Network Operations and Management Symposium, US, New York, NY: IEEE vol Conf. 10, pp. 828–835, Feb. 15, 1998.

International Search Report mailed on Oct. 6, 2000 for PCT Application PCT/US/00/09966.

Caruso, J. "NASA–funded software aids reliability," CNN.com—Dec. 22, 1999 http://www/cnn.com/1999/TECH/computing/12/22/nasa.software.idg/index.html.

Press Release: "Rainfinity Unveils Rainwall—Industry's First Fully Distributed Clustering Solution for Internet Gateways," Spring Internet World '99, Los Angeles, CA—Apr. 14, 1999.

*Primary Examiner*—Bunjob Jaroenchonwanit
(74) *Attorney, Agent, or Firm*—Heller Ehrman White & McAuliffe

(57) ABSTRACT

A scalable, distributed, highly available, load balancing server system having multiple machines is provided that functions as a front server layer between a network (such as the Internet) and a back-end server layer having multiple machines functioning as Web file servers, FTP servers, or other application servers. The front layer machines comprise a server cluster that performs fail-over and dynamic load balancing for both server layers. The operation of the servers on both layers is monitored, and when a server failure at either layer is detected, the system automatically shifts network traffic from the failed machine to one or more operational machines, reconfiguring front-layer servers as needed without interrupting operation of the server system. The server system automatically accommodates additional machines in the server cluster, without service interruption. The system operates with a dynamic reconfiguration protocol that permits reassignment of network addresses to the front layer machines. The front layer machines perform their operations without breaking network communications between clients and servers, and without rebooting of computers.

27 Claims, 22 Drawing Sheets

U.S. PATENT DOCUMENTS

| | | | | |
|---|---|---|---|---|
| 5,790,804 | A | * | 8/1998 | Osborne ...................... 709/245 |
| 5,835,725 | A | | 11/1998 | Chiang et al. ......... 395/200.58 |
| 5,867,706 | A | * | 2/1999 | Martin et al. ............... 709/105 |
| 5,892,925 | A | | 4/1999 | Aditya et al. ............ 395/200.6 |
| 5,898,830 | A | | 4/1999 | Wesinger et al. ...... 395/187.01 |
| 5,961,602 | A | * | 10/1999 | Thompson et al. ......... 709/229 |
| 5,963,720 | A | | 10/1999 | Grossman ................ 395/200.8 |
| 6,047,323 | A | * | 4/2000 | Krause ....................... 709/227 |
| 6,047,324 | A | | 4/2000 | Ford et al. .................. 709/227 |
| 6,070,191 | A | * | 5/2000 | Narendran et al. ......... 709/226 |
| 6,078,960 | A | * | 6/2000 | Ballard ....................... 709/229 |
| 6,088,796 | A | * | 7/2000 | Cianfrocca et al. ......... 713/152 |
| 6,094,680 | A | * | 7/2000 | Hokanson ................... 709/223 |
| 6,105,122 | A | * | 8/2000 | Muller et al. ................. 712/1 |
| 6,112,239 | A | * | 8/2000 | Kenner et al. ............. 709/224 |
| 6,119,143 | A | * | 9/2000 | Dias et al. .................. 709/201 |
| 6,128,277 | A | | 10/2000 | Bruck et al. ................ 370/221 |
| 6,154,777 | A | * | 11/2000 | Ebrahim ..................... 709/227 |
| 6,161,139 | A | * | 12/2000 | Win et al. ................... 709/225 |
| 6,182,138 | B1 | * | 1/2001 | Aoki ........................... 709/226 |
| 6,182,139 | B1 | * | 1/2001 | Brendel ...................... 709/226 |
| 6,185,601 | B1 | * | 2/2001 | Wolff ......................... 709/203 |
| 6,195,705 | B1 | * | 2/2001 | Leung ........................ 709/245 |
| 6,223,206 | B1 | * | 4/2001 | Dan et al. ................... 709/105 |
| 6,247,056 | B1 | * | 6/2001 | Chou et al. ................. 709/229 |
| 6,253,326 | B1 | | 6/2001 | Lincke et al. ............... 713/201 |
| 6,259,705 | B1 | * | 7/2001 | Takahashi et al. .......... 370/465 |
| 6,272,523 | B1 | * | 8/2001 | Factor ........................ 709/229 |
| 6,324,543 | B1 | * | 11/2001 | Cohen et al. ............... 707/200 |
| 6,324,683 | B1 | * | 11/2001 | Fuh et al. ................... 717/124 |
| 6,327,622 | B1 | * | 12/2001 | Jindal et al. ................ 709/228 |
| 6,327,628 | B1 | | 12/2001 | Anuff et al. ................. 709/311 |
| 6,330,602 | B1 | * | 12/2001 | Law et al. ................... 709/224 |
| 6,334,114 | B1 | * | 12/2001 | Jacobs et al. .................. 705/26 |
| 6,345,303 | B1 | * | 2/2002 | Knauerhase et al. ........ 709/238 |
| 6,360,256 | B1 | * | 3/2002 | Lim ........................... 709/223 |
| 6,374,299 | B1 | | 4/2002 | Ford et al. .................. 709/227 |
| 6,424,992 | B2 | | 7/2002 | Devarakonda et al. ...... 709/203 |
| 6,438,652 | B1 | * | 8/2002 | Jordan et al. ............... 711/120 |
| 6,449,647 | B1 | * | 9/2002 | Colby et al. ................. 709/226 |
| 6,480,508 | B1 | | 11/2002 | Mwikalo et al. ............. 370/475 |
| 6,611,498 | B1 | * | 8/2003 | Baker et al. ................ 370/252 |
| 2001/0023440 | A1 | * | 9/2001 | Franklin et al. ............. 709/226 |
| 2002/0103846 | A1 | * | 8/2002 | Zisapel et al. .............. 709/105 |

* cited by examiner

DISTRIBUTED SERVER IP ADDRESSES

ENTER THE INTERNAL IP ADDRESSES OF EACH COMPUTER THAT WILL BE A PART OF THE DISTRIBUTED SERVER CLUSTER. (ENTER ONLY ONE IP ADDRESS FOR EACH COMPUTER.)

IP ADDRESS:

1.1.1.4 — 1004

1006 ADD -->

1008 <-- REMOVE 1.1.1.1
1.1.1.2
1.1.1.3
1.1.1.4
— 1002

1010 NEXT

DISTRIBUTED SERVER CLUSTER FOR CONTROLLING NETWORK TRAFFIC

CROSS-REFERENCE TO RELATED APPLICATIONS

This application claims the benefit under 35 U.S.C. §119 (e) of U.S. Provisional Application Serial No. 60/128,872 entitled "A Reliable Distributed Internet Server System", filed Apr. 12, 1999, and is a continuation of U.S. patent application Ser. No. 09/437,637 entitled "Distributed Traffic Controller for Network Data", filed Nov. 10, 1999, now abandoned, which claims the benefit of Provisional application Ser. No. 60/107,827, filed Nov. 10, 1998, which are incorporated by reference.

BACKGROUND OF THE INVENTION

1. Field of the Invention

This invention relates generally to computer network data traffic and, more particularly, to computers that service and manage network requests for data files.

2. Description of the Related Art

To enable sharing of data among computer users, most computer systems in use today are connected to a computer network. Computers in an office, for example, may be connected over a local area network (LAN) to gain access to a server computer, which manages common data storage. As used herein, a server refers to a computer that services and manages requests for documents or data files from network computers utilizing wired and wireless communication networks. In the case of an Internet server, the computer network is the Internet. The Internet is a computer network in which literally millions of user computers communicate with server computers over a widely distributed network.

An Internet server may, for example, provide services such as servicing and managing requests for hypertext mark-up language (HTML) Web pages, providing and managing access to data bases, providing and managing access to News servers, Multimedia (including video and audio) servers, and Mail servers, as well as managing access to and functioning of e-commerce services. Some servers route such requests to an appropriate computer within a cluster of computers, each of which performs one of these server functions. The cluster of computers is generally referred to as a server farm.

The number of people using the Internet has been growing at a very fast rate, while the services provided over the Internet are increasingly becoming mission critical. Hence, enabling high performance, reliability, and availability, as well as the creation of management tools, have become key issues in the development and maintenance of Internet servers. The current approach for handling these issues from the server perspective is based on the concept of load balancing. The key to the load balancing approach is to handle the various network requests with a system called a load balancer, which is either a hardware device similar to a network router or a server computer executing load balancing software.

FIG. 1 illustrates an Internet server farm 102 that is served by a load balancer 104 computer. The server farm, for example, includes computers that operate as Web servers (for Web page requests) and as e-commerce servers 106, mail servers and news servers 108, and data base servers and multimedia servers 110. The load balancer 104 acts as a dispatcher to route data traffic it receives from the Internet 112 via a firewall 114. That is, the load balancer dispatches requests from the Internet to the appropriate server in the server farm 102, based on server function, availability, and load.

Servers that operate as load balancers may be obtained from or configured with software from a variety of vendors. For example, load balancer vendors include: Cisco Systems, Inc. of San Jose, Calif., USA; F5 Networks, Inc. of Seattle, Wash., USA; and Resonate, Inc. of Sunnyvale, Calif., USA.

Conventionally, load balancing systems comprise a single computer system acting as a dispatcher or primary active dispatcher, with a "hot" stand-by dispatcher that can take over the functioning of the primary dispatcher in the event that the primary dispatcher fails. This solution has a number of potential problems. First, the traffic between the internal and external networks (that is, from the load balancer toward the Internet and from the load balancer toward the server farm) goes through a single point that can become a bottleneck with respect to bandwidth performance. This situation becomes worse as the number of servers in the server farm increases and as the amount of traffic being handled increases. In addition, the primary active load balancer is a single point of failure in the case that there is no stand-by dispatcher available. When there is a stand-by dispatcher and a primary dispatcher failure occurs, the long reconfiguration time of the stand-by dispatcher can severely affect the quality of service for network users. Finally, conventional load balancing systems do not typically maintain the network connection between client machines and servers in the event of a server failure. This can require client machines to repeat their requests for data, reopening the network connection. All of these situations result in slowed responses or complete failures in response to network requests for Web pages and other data.

From the discussion above, it should be apparent that there is a need for a system that provides a scalable load balancing solution for server farms and also provides reliable network communications. The present invention fulfills this need.

SUMMARY OF THE INVENTION

The present invention provides a scalable, distributed, highly available, load balancing server system having multiple machines functioning as a front server layer between the network and a back-end server layer having multiple machines functioning as Web file servers, FTP servers, or other application servers. The front layer machines comprise a server cluster that performs fail-over and dynamic load balancing for both server layers. The operation of the servers on both layers is monitored, and when a server failure at either layer is detected, the system automatically shifts network traffic from the failed machine to one or more operational machines, reconfiguring front-layer servers as needed without interrupting operation of the server system. The server system automatically accommodates additional machines in the server cluster, without service interruption. A system constructed in accordance with the invention provides a front layer server cluster that manages multiple network addresses and ensures availability of all network addresses assigned to the front layer at all times. The system operates with a dynamic reconfiguration protocol that permits reassignment of network addresses to the front layer machines. The front layer machines perform their operations without breaking network communications between clients and servers, and without rebooting of computers. In this way, the system provides reliable network communication in a scalable load balancing solution for server farms.

In one aspect of the invention, a front layer server cluster constructed in accordance with the invention provides a resilient network connection in which network addresses can be moved among the cluster machines without breaking network connections between clients and the servers. The server cluster also provides a distributed network address translation (NAT) function among the front layer machines. In another aspect of the server cluster, servers can be dynamically added and deleted from the cluster without complicated configuration operations for the cluster. The server cluster also provides a Highly Available Internet Link so that transparent Web server fail-over can be achieved.

The server cluster may manage network address assignments and route network traffic, operating as a gateway. In that type of arrangement, the server cluster provides management of virtual network addresses such that network address assignments can be moved from gateway to gateway without requiring rebooting. Finally, the system provides symmetric routing of network traffic, guaranteeing that the incoming and outgoing traffic of the same network connection goes through the same front-layer server.

In accordance with the invention, a distributed server cluster for computer network data traffic dynamically reconfigures traffic assignments among multiple server machines for increased network availability. If one of the servers becomes unavailable, traffic assignments are moved among the multiple servers such that network availability is substantially unchanged. The front-layer servers of the server cluster communicate with each other such that automatic, dynamic traffic assignment reconfiguration occurs in response to machines being added and deleted from the cluster, with no loss in functionality for the cluster overall, in a process that is transparent to network users, thereby providing a distributed server system functionality that is scalable. Thus, operation of the distributed server cluster remains consistent as machines are added and deleted from the cluster. Each machine of the distributed cluster can continue with any applications it may be running, such as for implementing its server functioning, while participating in the distributed server cluster and dynamic reconfiguration processing of the present invention. In this way, the invention substantially maintains network availability regardless of machine failures, so that there is no single point of failure and no lapse in server cluster functionality.

In one aspect of the invention, the front-layer servers of the distributed server cluster communicate with each other by passing a Group Membership protocol word among the server cluster machines over a subnet network with which they are connected. The protocol word is used to inform the distributed server cluster servers of the cluster status, including the status of individual machines, in a token ring arrangement. Thus, each machine of the cluster becomes aware of any problem with any of the other machines in the cluster and is aware of the operational status and application data of each machine. With such knowledge, the machines will individually determine the traffic load being borne by the other machines. If any one machine observes that another machine is handling an excessive amount of network traffic, the observing machine will take on some of the traffic from the overloaded machine, thereby performing a load balancing operation. The consistent sharing of the application data enables the key distributed functionalities of the cluster.

In another aspect of the invention, a user can configure and monitor a machine of the distributed server cluster from any other machine of the cluster, and also can perform such configuration and monitoring from a remote location. Such operations can be conducted through a command line interface or through a graphical user interface (GUI) that permits real time changes in many operational parameters of the cluster.

Other features and advantages of the present invention should be apparent from the following description of the preferred embodiments, which illustrate, by way of example, the principles of the invention.

BRIEF DESCRIPTION OF THE DRAWINGS

FIG. 10 is a representation of a GUI setup screen as shown on the display device of the FIG. 6 computer, in accordance with the present invention, for setting up primary IP addresses.

DESCRIPTION OF THE PREFERRED EMBODIMENTS

In a preferred embodiment of a network server cluster constructed in accordance with the present invention, a network server cluster includes multiple server machines that provide a scalable, distributed, highly available, load balancing front-layer server system between the network and a back-end server layer having multiple machines functioning as Web file servers, FTP servers, mail servers, or other application servers. The front layer machines comprise a server cluster that performs fail-over and dynamic load balancing for both server layers.

Figure 1:
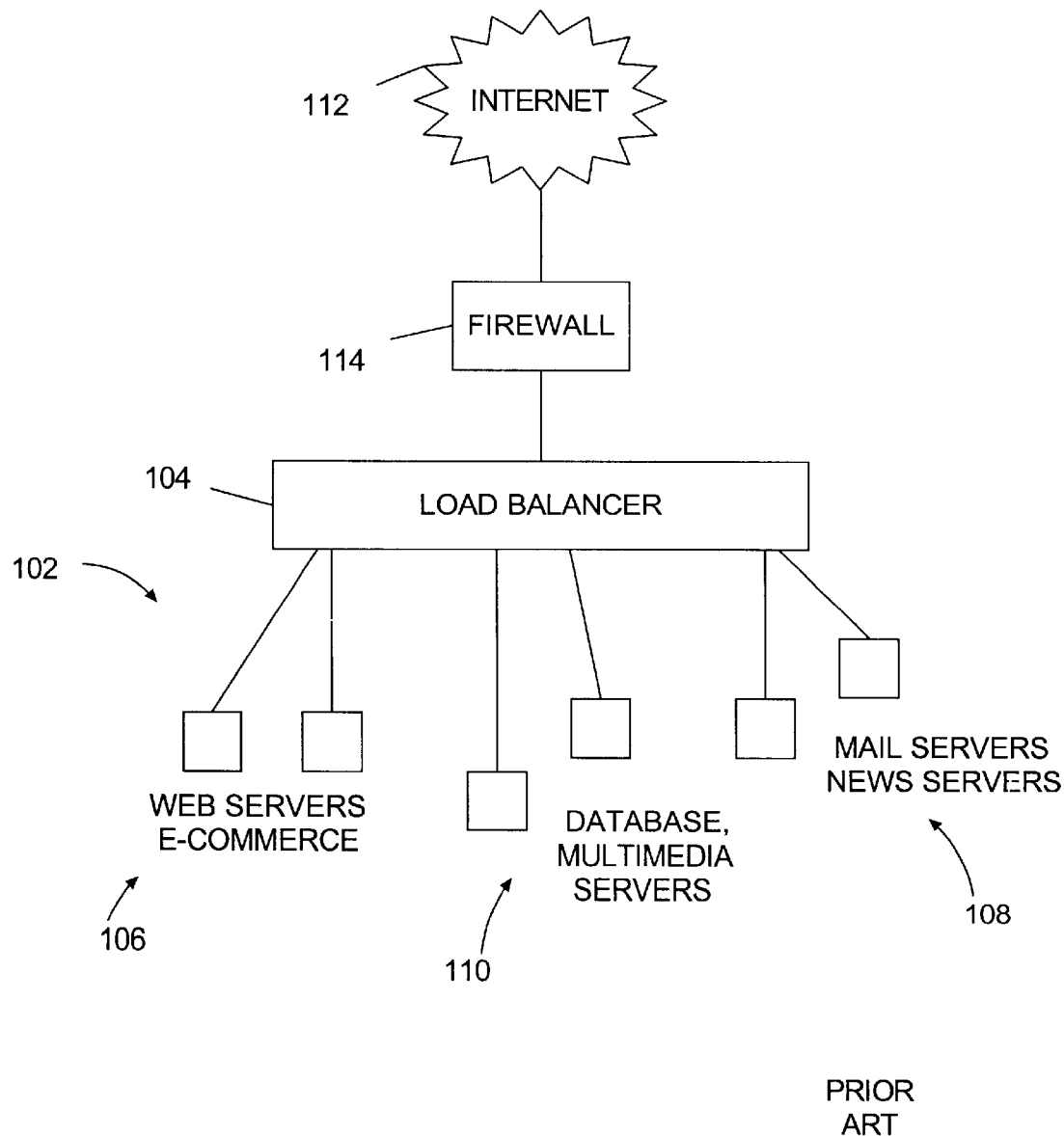
FIG. 1 is a schematic block diagram of a conventional network server cluster with a load balancing server for the server farm.
Figure 2:
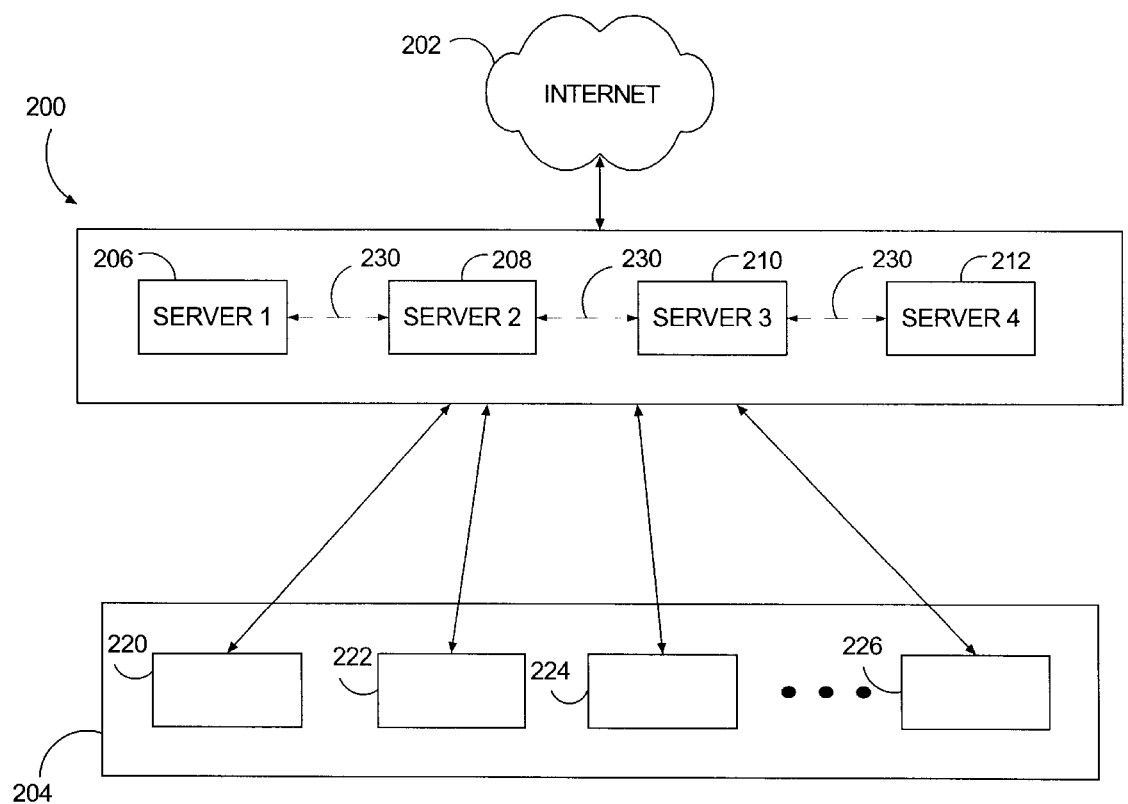
FIG. 2 is a schematic block diagram of a server system comprising multiple distributed server clusters constructed in accordance with the invention.

FIG. 2 shows a server system 200 constructed in accordance with the present invention to communicate with the Internet 202. The server system 200 includes multiple (two or more) server computers that comprise a front-layer server system that communicates with a network 202, such as the Internet, and also communicates with a back-end server layer 204 having multiple computers functioning as application servers. The front-layer servers 200 will also be referred to as a server cluster or gateway, and the individual servers 206, 208, 210, 212 will also be referred to as distributed servers. The front-layer system is illustrated as having four servers 206, 208, 210, 212, but it should be understood that a lesser or greater number of front-layer servers also could be provided. Similarly, four servers 220, 222, 224, 226 are shown as application servers, but a lesser or greater number of back-end servers could be provided. The back-end servers 204 will typically include, for example, servers that are configured to function as Web file servers, FTP servers, mail servers, news servers, or other application functions.

Each of the distributed servers 206, 208, 210, 212 operates to provide a resilient network connection in which network addresses can be moved among the cluster machines 200 without breaking network connections between clients and the servers. Each server also can provide a distributed network address translation (NAT) function among the front-layer machines. In addition, distributed servers can be dynamically added and deleted from a server cluster without carrying out complicated configuration operations for the cluster. The machines of the server cluster 200 also provide a highly available network link so that an HTTP transaction will not be interrupted by a Web server failure. Each server cluster also provides management of virtual network addresses such that network address assignments can be moved from cluster machine to cluster machine without requiring rebooting, particularly in the "Windows NT" operating system. Finally, the system 200 provides symmetric routing of network traffic among the cluster machines, to guarantee that incoming and outgoing traffic will be distributed symmetrically among the machines. The lateral lines 230 in FIG. 2 connecting the cluster machines 206, 208, 210, 212 indicate that state sharing and unique protocol words are communicated among the machines. Each of the distributed server functions will be described in greater detail below.

A. Cluster Configuration and Protocol Operation

The unique server functions mentioned above are provided through a special configuration and protocol word that is passed among distributed server machines in the server cluster. The cluster configuration and protocol operation will be described next, followed by description of the unique server functions.

1. The Distributed Server Cluster

Figure 3:
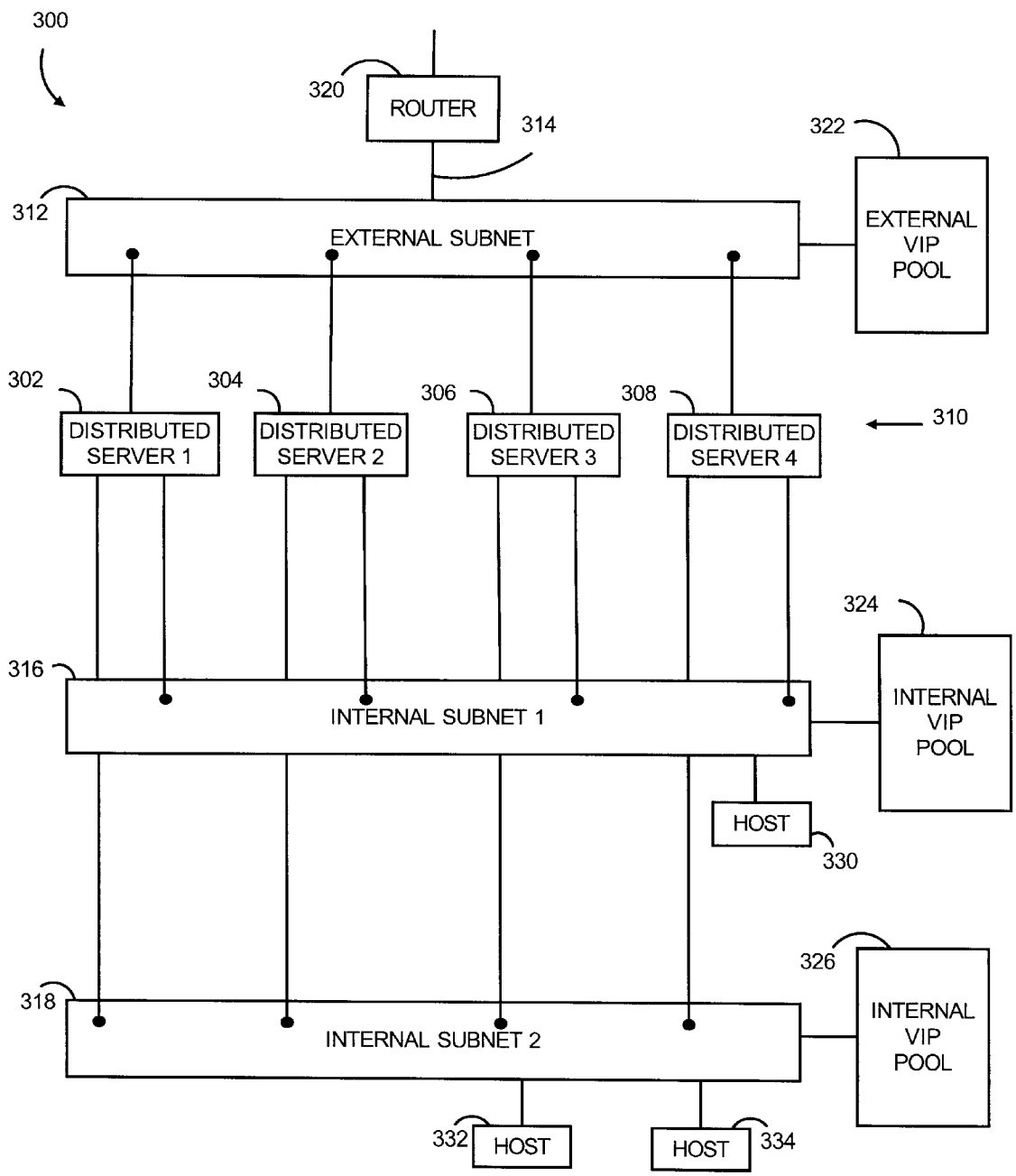
FIG. 3 is a schematic diagram of a distributed server cluster constructed in accordance with the present invention.

FIG. 3 is a representation of a computer system 300 constructed in accordance with the present invention. A system constructed in accordance with the present invention is set up to include at least two computers acting as a distributed server cluster. The exemplary FIG. 3 system 300 includes four machines 302, 304, 306, 308 that act as a server cluster 310 between an external subnet 312 interface to the Internet 314 and optionally to two internal subnets 316, 318 to which database machines may be connected. When connected to the internal subnets, the four machines 302, 304, 306, 308 control network traffic to and from the internal subnets. The four machines of the server cluster can dynamically reconfigure traffic assignments among themselves and provide increased network availability and improved server response to client machines over the Internet. For example, if one of the machines 302, 304, 306, 308 becomes unavailable, traffic assignments are moved among the remaining machines such that network availability to host machines on the internal subnets 316, 318 is substantially unchanged. In the illustrated embodiment of FIG. 3, the external network is the Internet, and therefore the data traffic being handled by the server cluster 310 follows the TCP/IP protocol model, but it should be understood that other network protocols may be accommodated by a distributed server cluster constructed in accordance with the invention, without departing from the teachings of the invention.

As described further below, the machines 302, 304, 306, 308 of the distributed server cluster 310 communicate with each other such that dynamic traffic assignment reconfiguration occurs automatically in response to any machine being added or deleted from the server cluster 310, with no loss in functionality for the cluster. The reconfiguration process is transparent to local network users, thereby providing a distributed server functionality that is scalable. Each machine of the server cluster may implement an operational function to collectively provide a cluster function, such as web server, e-mail server, or encryption services, and can interface with subnet machines that provide data services or other file serving duties consistent with the cluster function. Each machine of the server cluster can continue with its operational functions while it participates in the distributed server cluster and dynamic reconfiguration processing. In this way, the invention substantially maintains network availability regardless of machine failures, so that there is no single point of failure and no lapse in server cluster functionality.

Each machine 302, 304, 306, 308 of FIG. 3 is associated with an Internet protocol (IP) address that uniquely identifies the machine and provides an address that is associated with a network interface card (NIC) of the respective machine. This IP address, which is associated with a physical resource such as the NIC, will be referred to as a primary (or physical) IP address, and is an address off of the respective subnet 316, 318. Those skilled in the art will understand that each of the machines includes a NIC interface for each network (internal and external) to which the machine is connected.

In accordance with the invention, the machines 302, 304, 306, 308 provide a distributed server cluster by maintaining a set of dynamically assignable IP addresses for each subnet 312, 316, 318. The set of assignable IP addresses for each subnet is called a virtual IP (VIP) pool. Each subnet 312, 316, 318 in FIG. 3 is identified with a respective virtual IP pool 322, 324, 326. Software that provides the distributed server cluster functionality is installed in each of the machines 302, 304, 306, 308. Thus, in FIG. 3, each one of the server cluster machines includes three NIC interfaces, for connection of the respective machine to the external subnet 312 and the two internal subnets 316, 318, and each of the server cluster machines is associated with a primary IP address and with a virtual IP address for each subnet. It should be understood that connection to the internal subnets is optional for the server cluster functionality.

Because of the distributed server cluster software installed at each machine 302, 304, 306, 308, users or host machines on both sides of the server cluster 310 will know of and will direct data packets to an address in one of the virtual IP pools, rather than the primary IP address associated with each server cluster machine. Thus, a router 320 that directs data traffic to the computers behind the server cluster 310 will be aware of only the IP addresses in the virtual IP pool 322 on the external subnet and will not be aware of the primary IP addresses assigned to the NIC cards of each respective server cluster machine 302, 304, 306, 308. Similarly, the internal host machines 330, 332, 334 behind the server cluster 310 will be aware of only the IP addresses in the virtual IP pools 324, 326 on the respective internal subnets 316, 318 and will not be aware of the primary IP addresses assigned to the NIC cards in the server cluster machines for each connection to an internal subnet.

As described more fully below, the dynamic assignment of virtual IP addresses to primary IP addresses permits reconfiguration in response to machine problems and in response to variations in network traffic loading among the machines. If a server cluster machine becomes unavailable, then the virtual IP address (or addresses) for which it was responsible are simply assigned to one or more different server cluster machines. This capability is referred to as a fail-over capability. A related feature is the scalability of the system, such that the system automatically reconfigures itself dynamically as machines are added or deleted. This also permits more efficient workload distribution among the server cluster machines. If a server cluster machine becomes heavily burdened with data traffic, one or more of the virtual IP addresses assigned to it will instead be assigned to one or more different server cluster machines.

2. System Software Components

Figure 4:
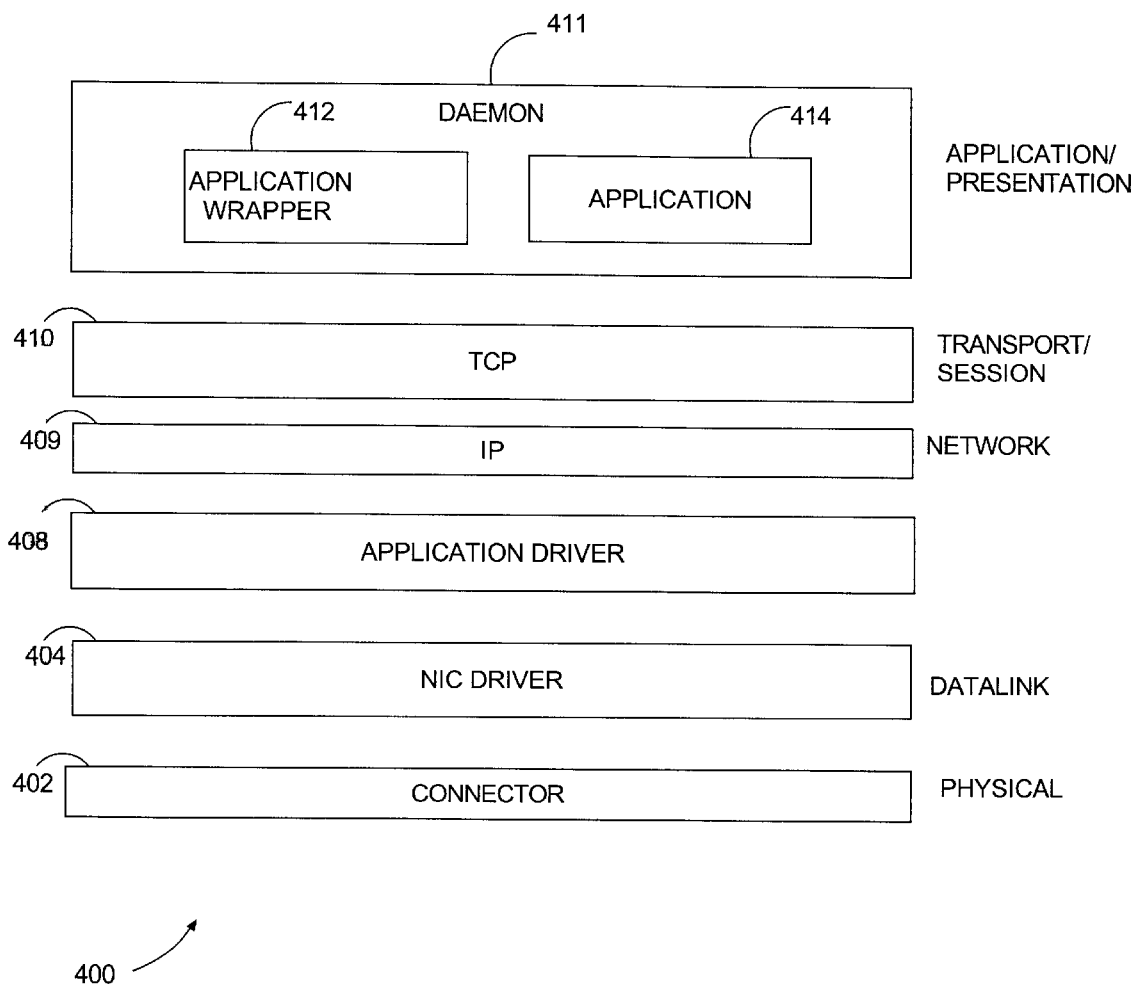
FIG. 4 is a representation of a server computer in the distributed server cluster of FIG. 3, illustrating the OSI networking model components of the server computer constructed in accordance with the present invention.

FIG. 4 is a representation of a server cluster computer in FIG. 3, illustrating the system architecture 400 of the server cluster constructed in accordance with the present invention. Those skilled in the art will understand that FIG. 4 is a system architecture representation in terms of the Open Systems Interconnection (OSI) networking model published by the International Standards Organization.

The lowest level of the system architecture is the Physical layer, Layer 1, where data packets are received at a cable connection 402 from the distributed server cluster machine to a subnet, which in the preferred embodiment typically comprises an Ethernet peer-to-peer network. The next OSI level is the Data Link layer, which packages data bits received from the physical layer into data frames that are processed by the higher layers. The Data Link layer is responsible for providing an error-free transmission of data frames between computers through the Physical layer. For example, data packets in the server cluster machine are physically received at a network interface card (NIC) of the server cluster from a network cable connection. FIG. 4 shows the data link layer function being performed by a NIC Driver 404, which may be a conventional driver program for processing data traffic received in accordance with the Ethernet protocol, or whatever protocol is used for the associated subnet with which the NIC communicates.

The Network layer of the OSI system model determines which path data will take from a source computer to a destination computer, and is occupied by the Internet Protocol (IP) in the TCP/IP protocol stack. In FIG. 4, the application driver 408 situates between the network (IP) layer 409 and the datalink layer 404. The application driver refers to driver software that supports operation of the machine as a distributed server in accordance with the present invention.

The next layer in the OSI model is the Transport layer, which in FIG. 4 is represented by the TCP stack 410. The Transport layer repackages messages so as to avoid errors and ensure data is in the proper sequence. The details of this OSI layer in general, and the TCP/IP functioning in particular, will be well understood by those skilled in the art. In the Application/Presentation layer, the distributed server of the invention includes the Daemon 411 constructed in accordance with the invention, which may contain an Application Wrapper 412 and Application 414, which comprises software that provides the server functionality in accordance with the present invention. Thus, the Daemon 411 is the software that provides the distributed server functionality in accordance with the invention.

Figure 5:
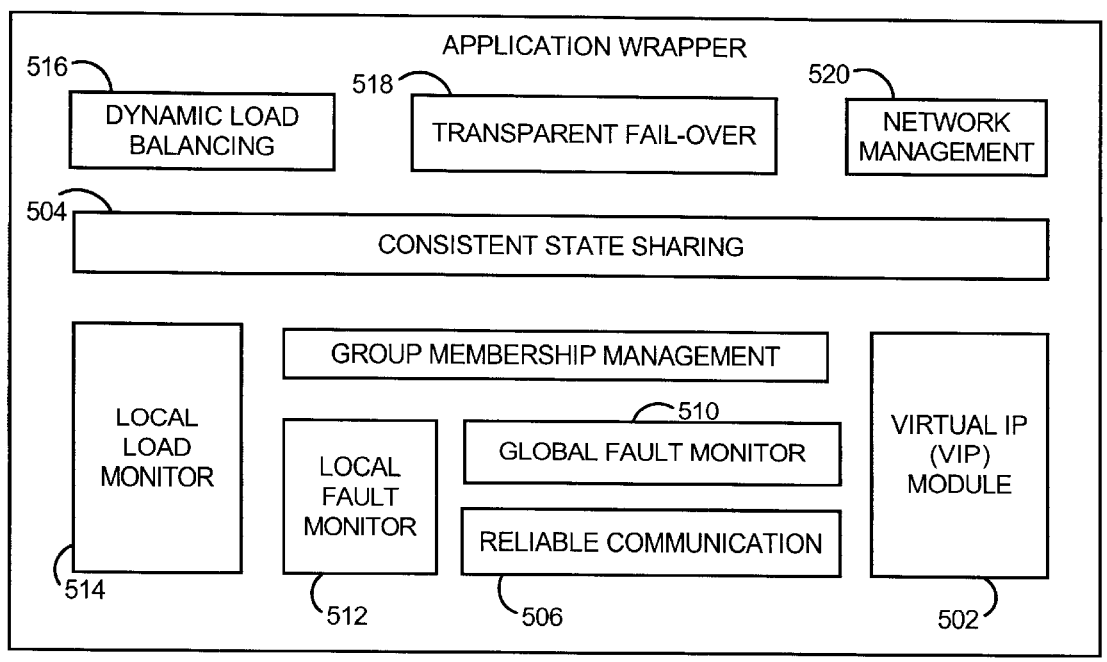
FIG. 5 is a representation of the system architecture for the Application Wrapper illustrated in FIG. 4.

FIG. 5 shows details of the Daemon 411 to better illustrate the architecture of the distributed server cluster. One component function of the Daemon is the Virtual IP Address module 502, which maintains the virtual-to-primary IP address mapping between the primary addresses and the virtual IP address pool. Consistent State Sharing 504 is a module that permits the server cluster machines to know which machines are functioning and which virtual IP addresses have been assigned to each of the machines. The Reliable Communication 506 component tracks acknowledgment messages communicated around the server cluster, and also helps implement Group Membership Management 508, which keeps track of the available machines. Network operations are monitored by the Global Fault Monitor 510, which is complemented by a Local Fault Monitor 512 for the particular machine on which the Application Wrapper is running. A Local Load Monitor 514 determines the data flow rate through the NIC interface in bytes as well as the CPU load to keep track of machine loading. The Dynamic Load Balancing 516 ensures that no single server cluster machine becomes overloaded. It does this by moving virtual IP address assignments, if necessary, in view of the monitored local loads. The Transparent Fail-Over 518 ensures that a failed machine is quickly replaced with an alternative machine, thereby providing high availability in a manner that is transparent to users. These functions operate in conjunction with overall Network Management tasks 520 performed by the server cluster software.

3. Computer Construction

Figure 6:
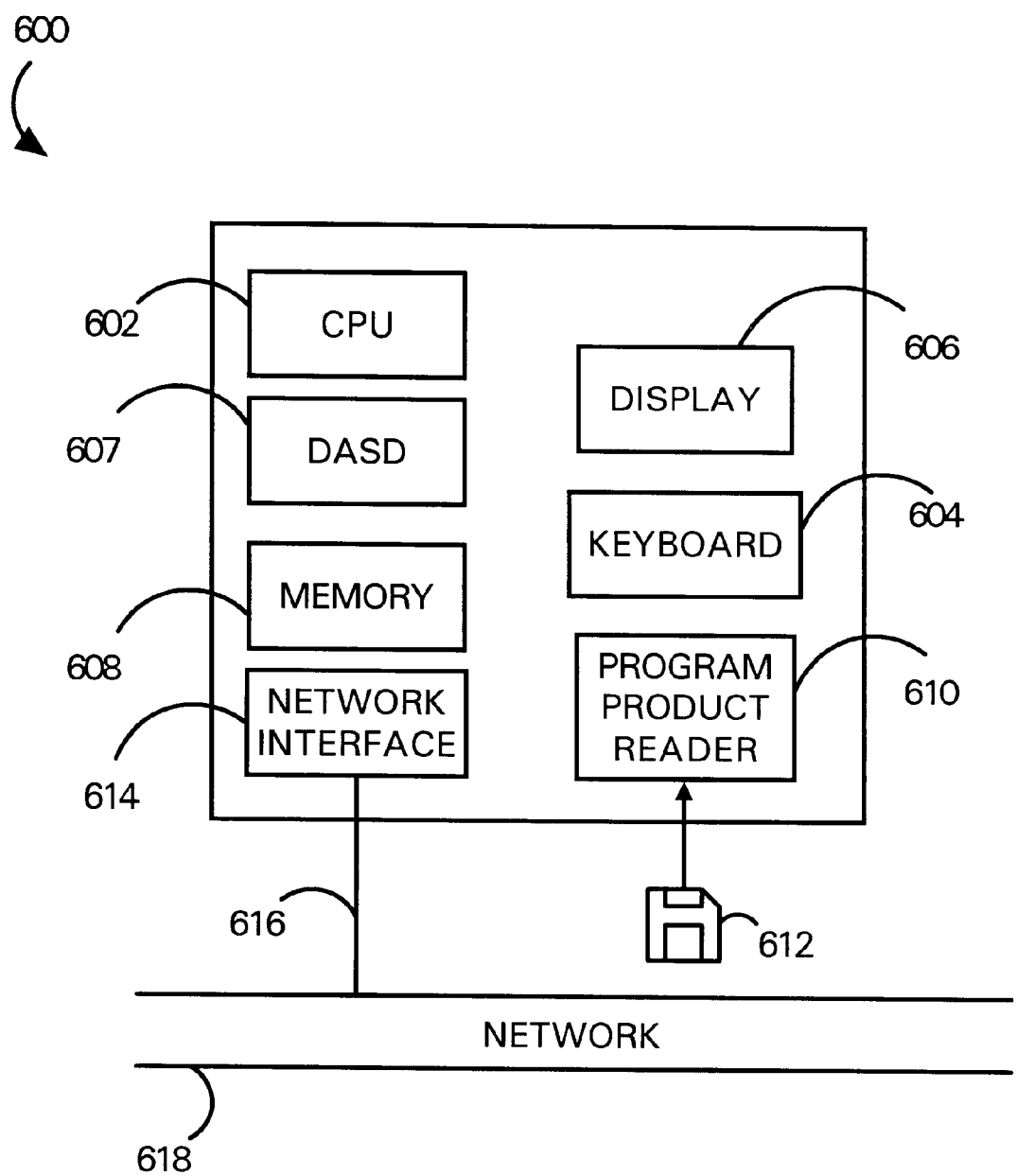
FIG. 6 is a block diagram of a server computer in the system of FIG. 3, illustrating the hardware components of the computer.

FIG. 6 is a block diagram of a server cluster computer in the server system of FIG. 3, illustrating the hardware components for one of the computers. Those skilled in the art will appreciate that the server cluster computers 302, 304, 306, 308 and the internal host computers can all have a similar computer construction.

FIG. 6 is a block diagram of an exemplary computer 600 such as might comprise any of the computers 302, 304, 306, 308. Each computer 600 operates under control of a central processor unit (CPU) 502, such as a "Pentium" microprocessor and associated integrated circuit chips, available from Intel Corporation of Santa Clara, Calif., USA. A computer user can input commands and data from a keyboard 504 and can view inputs and computer output at a display 606. The display is typically a video monitor or flat panel display. The computer 600 also includes a direct access storage device (DASD) 607, such as a hard disk drive. The memory 608 typically comprises volatile semiconductor random access memory (RAM). Each computer preferably includes a program product reader 610 that accepts a program product storage device 612, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc. Each computer 600 can communicate with the others over the network through a network interface 614 that enables communication over a connection 616 between the network 618 and the computer. The network interface typically comprises, for example, a Network Interface Card (NIC) that permits communications over a variety of networks. In the server cluster 310 (FIG. 3), the network can comprise an Ethernet network or can comprise a connection to the Internet.

The CPU 602 operates under control of programming steps that are temporarily stored in the memory 608 of the computer 600. When the programming steps are executed, the Distributed Server cluster machine performs its functions. Thus, the programming steps implement the functionality of the distributed system architecture modules 410 illustrated in FIG. 5. The programming steps can be received from the DASD 607, through the program product storage device 612, or through the network connection 616. The storage drive 610 can receive a program product 612, read programming steps recorded thereon, and transfer the programming steps into the memory 608 for execution by the CPU 602. As noted above, the program product storage device 612 can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 608 over the network 618. In the network method, the computer receives data including program steps into the memory 608 through the network interface 614 after network communication has been established over the network connection 616 by well-known methods that will be understood by those skilled in the art without further explanation. The program steps are then executed by the CPU to implement the processing of the Distributed Server Cluster system.

It should be understood that all of the computers 302, 304, 306, 308 of the computer system illustrated in FIG. 3 have a construction similar to that shown in FIG. 6, so that details described with respect to the FIG. 6 computer 600 will be understood to apply to all computers of the system 300. Alternatively, any of the computers 302, 304, 306, 308 can have an alternative construction, so long as they can communicate with the other computers and support the functionality described herein.

4. Group Membership Protocol Word

The fail-over operation, scalability of the system, assignments of virtual IP (VIP) addresses to machines, and the ability to dynamically reconfigure such assignments, are achieved with the distributed server cluster software through a Group Membership protocol word that provides state sharing information among all the machines in a cluster. The state-sharing protocol word is passed around the cluster machines who are members of the same subnet in a token ring arrangement that will be familiar to those skilled in the art.

Figure 7:
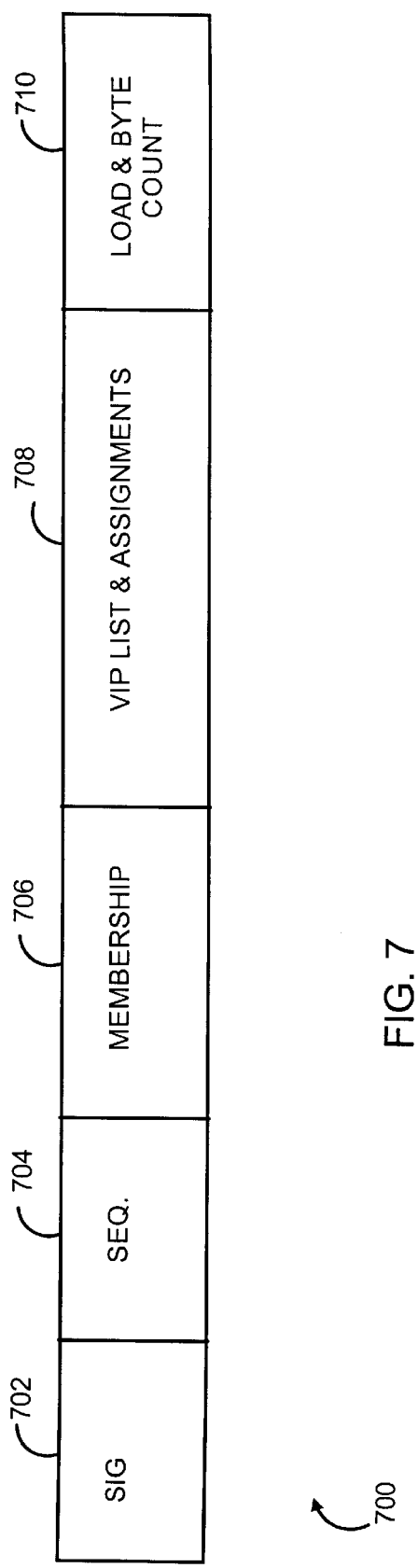
FIG. 7 is a representation of the Group Membership protocol word used by the server computer of FIG. 4 in communicating status information in the computer system of the invention.

FIG. 7 is a representation of the Group Membership state protocol word 700 that is used by the cluster computers of FIG. 6 in communicating the state information among the machines of the distributed server cluster. The state protocol word 700 includes a Signal Type (SIG) field 702 indicates whether the word is a token message for normal operating conditions or is a notification message (also called a "911" message). The next field is a Sequence (SEQ) field 704 that is incremented by each node as the message makes its way around the nodes of the cluster. The next field is a Membership field 706 that indicates the group composition of the cluster, followed by a VIP list and assignments field 708, and Operational Data field containing load and byte count data 710 that indicates the data flow rate through a node. In particular, the data flow rate is indicated by information retrieved from the NIC of the node. Each received Group Membership message, whether it is a normal token message or a "911" message, is parsed by the distributed server cluster software of each particular cluster machine to extract the necessary data.

The Sequence number field 704 is incremented by each node when it receives a message (a token message or 911 message). An initial random sequence number is selected as a default start value, and when the sequence numbering reaches a predetermined limit value, the sequence numbering wraps around and begins at the start value. When a node puts a message on the subnet, the node increments the sequence number that was contained in the received token, places the incremented token back out on the subnet, and stores the incremented number in memory. Thus, any message produced by a node will have a unique sequence number. A node should not receive a token message with a sequence number lower than the sequence number stored in its memory.

The Membership field 706 in a token message is a collection of sub-fields to indicate group composition. In particular, the Membership field of the preferred embodiment contains data that provides the number of nodes in the cluster, a list of the nodes, the current node sending the token message, and the destination node (the next node in the cluster, the node to whom the message is being sent). Each node changes the appropriate membership field values when the node receives the token, and in this way ensures that the token is passed along the machines in the cluster, from node to node in proper sequence.

For example, the "number of nodes" field in a token message might indicate a cluster having four nodes, such as illustrated in FIG. 3. The token message might indicate subnet addresses of (1.1.1.1), (1.1.1.2), (1.1.1.3), and (1.1.1.4) in the "list of nodes" data of the Membership field 706. If the nodes are numbered, from first to last, as −1, −2, −3, and −4, and if, at a particular point in time, the token is being sent from the second node (node −2) and is received at the third node (−3), then the "current node" value is "2" (the second node in the cluster) and the "destination node" value is "3" (the third node). After the third node (−3) receives the token, the third node changes the "current node" to "3", changes the destination node to "4", and sends the token back out on the subnet to the next node. In this way, each node always knows whether it is the intended recipient of a token message.

The Membership field 706 in a "911" message includes two sub-fields comprising an originating node address and a permission flag. A "911" message is sent by a node (the "originating node") when that node determines that the token message might have been lost somewhere in the cluster, and therefore might need to be regenerated. This may occur, for example, if another node fails when it has possession of the token message for processing. In that case, the originating node needs to determine if it has the latest copy of the token to regenerate the token. This determination is made with the help of the "911" message.

As a "911" message is sent around the machines of a distributed server cluster, the permission flag value in the message is set to TRUE by each node when it receives the "911" message, unless a receiving node has a higher sequence number stored in its memory for the last token message it sent out. If the receiving node has a higher sequence number, then it sets the permission flag to FALSE before putting the "911" message back out on the subnet. When the originating node receives back the "911" message, it will examine the message to determine if the permission flag sub-field contains TRUE or FALSE. If the permission flag is FALSE, then the originating node will not regenerate the token message it has in memory. That is, when the "911" message received by the originating node says FALSE, that means another node has already sent out a more recent token, with a higher sequence number. Therefore, the originating node will wait for the next token message (having a higher sequence number), and will adopt the system values (VIP list, membership, etc.) that are indicated in that token. If the originating node receives a "911" message back with TRUE, then the originating node knows it has the most recent token, so it will re-send the last token message it has, with all its system values (VIP list, membership, etc.). The unique sequence number ensures that only one node, the one with the most recent token message, will change the permission flag to TRUE.

The Group Composition field 708 of the Group Membership protocol word 700 contains a list of virtual IP addresses (VIP list) and of corresponding node assignments for those addresses. The Group Composition field contains sub-fields of data that specify the VIP address, the primary IP address to which that VIP address is currently assigned, an indication for each VIP address whether there is a preference for assignment to that address, and a persistence or "sticky" flag to indicate whether the preference is sticky. A sticky VIP address assignment means that the VIP address will be forced to an assignment to that particular node, so that all traffic for that VIP address must be directed to that node, unless the machine is unavailable. Thus, a sticky assignment in the Membership field means that all data traffic for that node will be directed to that node, if the node is available. If the node fails, traffic will be re-routed. If the node comes back up, then the data traffic intended for the node will again be directed to that node. A persistence flag set to a non-zero value indicates that a user has indicated a preference for assigning that VIP address to the node involved.

For example, if there are four addresses in the VIP list, then the information in the Group Composition field 708 might be summarized in Table 1 below:

TABLE 1

| VIP Address | Current Host | Preferred Host | Persistence Flag |
|---|---|---|---|
| 1.1.1.1 | 1.1.1.5 | 1.1.1.6 | 0 |
| 1.1.1.2 | 1.1.1.5 | 1.1.1.5 | 1 |
| 1.1.1.3 | 1.1.1.6 | 0.0.0.0 | 0 |
| 1.1.1.4 | 1.1.1.6 | 1.1.1.6 | 3 |

As Table 1 shows, the Group Composition field 708 contains four sub-fields: VIP address, Current Host, Preferred Host, and Persistence Flag. Each of the first three field holds the value of an IP address. The last field is an integer. In the preferred embodiment, data in the Group Composition field 708 will be placed in sequence, so that data for the first row of Table 1 is listed in the Group Composition field, followed by data for the second row, and so forth. Other schemes for packing the Group Composition field may be used.

In the Group Composition data, there is one VIP address sub-field, providing a VIP list for the entire cluster. The first sub-field, VIP address, lists the VIP addresses for the entire distributed server cluster. The second sub-field, Current Host, specifies which node currently owns this particular VIP address. The primary IP address of that node is used in the Current Host value. For example, according to Table 1, node (1.1.1.5) owns, or is assigned, VIP addresses (1.1.1.1) and (1.1.1.2). The third sub-field, Preferred Host, indicates the node at which this VIP prefers to be hosted. For example, to move VIP address (1.1.1.1) from Node (1.1.1.5) to Node (1.1.1.6), it would be necessary to specify Current Host as (1.1.1.5), and Preferred Host as (1.1.1.6). The VIP address assignments indicated by the Current Host and Preferred Host data sub-fields can be changed by a user during real-time operation of the distributed server cluster application through a user interface, which is described in greater detail below.

The last sub-field of the Group Composition data is the Persistence Flag. It indicates whether the associated VIP address is "sticky" to the Preferred Host. When a VIP address is "sticky" to an assigned node (the one it is associated with in the same row of Table 1), it is no longer handled by the load balancing process of the distributed server cluster application wrapper. The Persistence Flag field can take three possible integer values: "0", "1" and "3". When it is "0", it means that the associated VIP address is not sticky to any node. This VIP address can be moved, if so required by the load balancing process. When the Persistence Flag is "1", it means this VIP address is sticky to the Current Host specified in the same row of Table 1, and therefore it is not handled by the load balancing process. If the Current Host fails, this VIP address assignment will move to another node of the subnet, and will become sticky to that node. It will stay on that node even if the original Host recovers. When the Persistence Flag is "3", it means this VIP address is sticky to the Preferred Host.

Whenever the Preferred Host is functioning (alive), the VIP address will move to the Preferred Host node and stay with it (becomes "sticky" to it). When the Preferred Host fails, it fails over to another node of the subnet. The VIP address will move back to the Preferred Host when the Preferred Host recovers. It should be noted that regardless of which value the Persistence Flag takes, when the Current Host fails, the associated VIP address will always fail over to a healthy (alive) node. As described further below, the "sticky" feature of a VIP address assignment can be changed by a user in real time through a system interface.

Returning to FIG. 7, the last data field of the protocol word 700 is the load and byte count data field 710. This data field indicates the traffic flow of message packets through each of the distributed server cluster machines of the cluster subnet. In the preferred embodiment, the data comprises a byte count of data through the network interface card that connects each distributed server cluster machine to the subnet. As with the group composition field 708, the byte count field 710 is organized in the protocol word such that the data for the first node occurs first, then the second node, then the byte count data for the third node, and so forth for each of the machines in the cluster who are connected to the pertinent subnet.

In accordance with the invention, the protocol word 700 is circulated around the subnet from machine to machine, in sequence. Each machine receives a protocol word as part of the group membership message that is passed from machine to machine approximately at a rate of once every 100 milliseconds. Other message passing rates may be used, depending on the network configuration and machine operation.

5. Machine Operation

Figure 8:
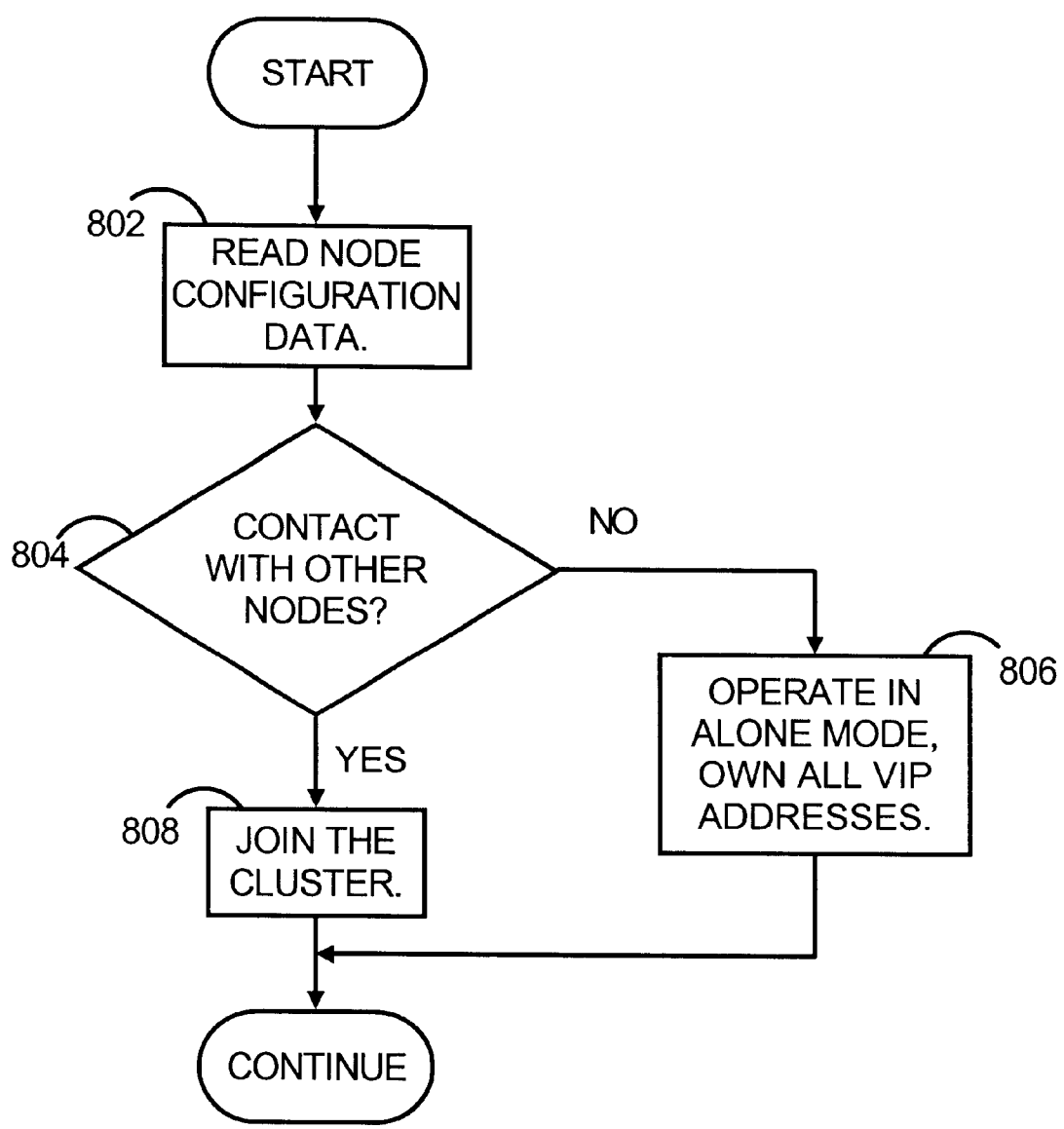
FIG. 8 is a flow diagram of the operating steps executed by a server computer of the FIG. 3 distributed server cluster in starting up and processing group membership messages on a subnet of the server system.

FIG. 8 is a flow diagram of the operating steps executed by a distributed server cluster computer of FIG. 3 in starting up and processing group membership messages on a subnet of the system. This processing is executed by the computer from its program memory once the appropriate distributed server cluster application software is loaded onto the computer and the setup operation (described below) has been completed.

In the first processing step performed by the starting computer, represented by the flow diagram box numbered 802, the configuration data of the machine is read from the direct access storage device, such as the hard disk of the computer. The configuration data includes a number of stored configuration files, including a node map, the virtual IP addresses of the cluster, cluster configuration options, local fault monitoring specification for the machine, and a license key or password. The node map contains the primary IP addresses of all the nodes in the cluster, in an arbitrary ordering around the subnet that is determined by the user during the setup process. The configuration files specify the "initial" cluster setup. Users can change these settings at runtime with the user interface described below. Such runtime changes will not affect the configuration files, though a user may manually edit them with a text editor.

From the node map of the configuration data, the computer that is starting up knows whether it has companion machines in the subnet cluster, and it knows how many additional machines to expect in the cluster. Therefore, the starting computer next will attempt to contact all of the other machines on the subnet and determine if it is the first executing machine in the cluster. This process is represented by the decision box numbered 804.

The process of a starting computer to determine if it is the first operational node involves first sending a unicast UDP (User Datagram Protocol) packet message. The UDP message implements a conventional connectionless protocol message that provides a means of sending and receiving datagrams over a network. Those skilled in the art will be familiar with the use of UDP packet messages. The UDP message sent by a starting computer includes a Group Membership protocol word, as described above in conjunction with the description of FIG. 7.

If the starting computer is actually attempting to recover or regenerate a token, and is not involved in an initial start sequence, then it could use the UDP message to send a "911" or notification message, as described above. When the computer rejoins the cluster, it will use the current cluster setup information in a token message for the cluster properties. If the starting computer is actually starting up from a cold start, then the UDP message will comprise a token message, such as that described above, that includes all the node data and configuration information that the starting computer retrieved from its configuration files. In either case, the computer that sends out the message waits for a reply.

If the starting computer receives no replies to the message for all other nodes in the configuration, then it knows it must be the first node in the cluster. This corresponds to an affirmative (YES) outcome at the decision box numbered 804. If the starting computer is the first cluster computer, then it assumes responsibility for all the VIP addresses in the cluster. Thus, it will set the data fields in the Group Membership protocol word accordingly, and continue data traffic handling operation while it waits for the other machines of the cluster to join. In accordance with operation of the cluster machines of the invention, the starting computer will send out a gratuitous ARP (Address Resolution Protocol) message for each VIP address that it takes. This mode of operation is referred to as "alone mode", and is indicated by the FIG. 8 flow diagram box numbered 806.

Those skilled in the art will be familiar with the conventional ARP scheme for translating logical IP addresses into physical network interface addresses in conjunction with stored address resolution information. More particularly, the network interface addresses are also known as Media Access Control (MAC) addresses for network cards. The ARP message is a conventional means of storing logical to physical address data in the machines connected to a network, such as each of the subnets connected to the starting computer. Thus, for each subnet to which it is connected, the starting computer will determine if it is the first node and, if it is, the starting computer will send out a gratuitous ARP message for the VIP addresses that it is taking.

If the starting computer receives a reply to the UDP message, then it knows other machines are active in the cluster, and it will attempt to join the cluster. This corresponds to the "join cluster" processing of box 808, following the negative outcome (NO) of the decision box 804. Any node that is already active and has received the UDP message from the starting computer will accept the starting computer into the operating cluster, in the following manner.

As noted above, a starting computer will send a 911 message with a Group Membership protocol word over the subnet with the data it has retrieved from its configuration files. When the operating node receives the 911 message from the starting computer, the operating node processes the node list in the message and adds the starting node into the list, as appropriate. Thus, permanent connections specified by initial data may indicate a particular VIP address assignment, or predetermined default assignments may be used. In either case, the operating node adds the new node into the node list data and then puts the processed Group Membership token back out onto the subnet. When the starting computer receives back the Group Membership token, it will process the node assignment data to reflect the presence of the operating node, and it thereby becomes part of the cluster. The starting computer will then pass the Group Membership token along, back out onto the subnet, in its normal operation.

Figure 9:
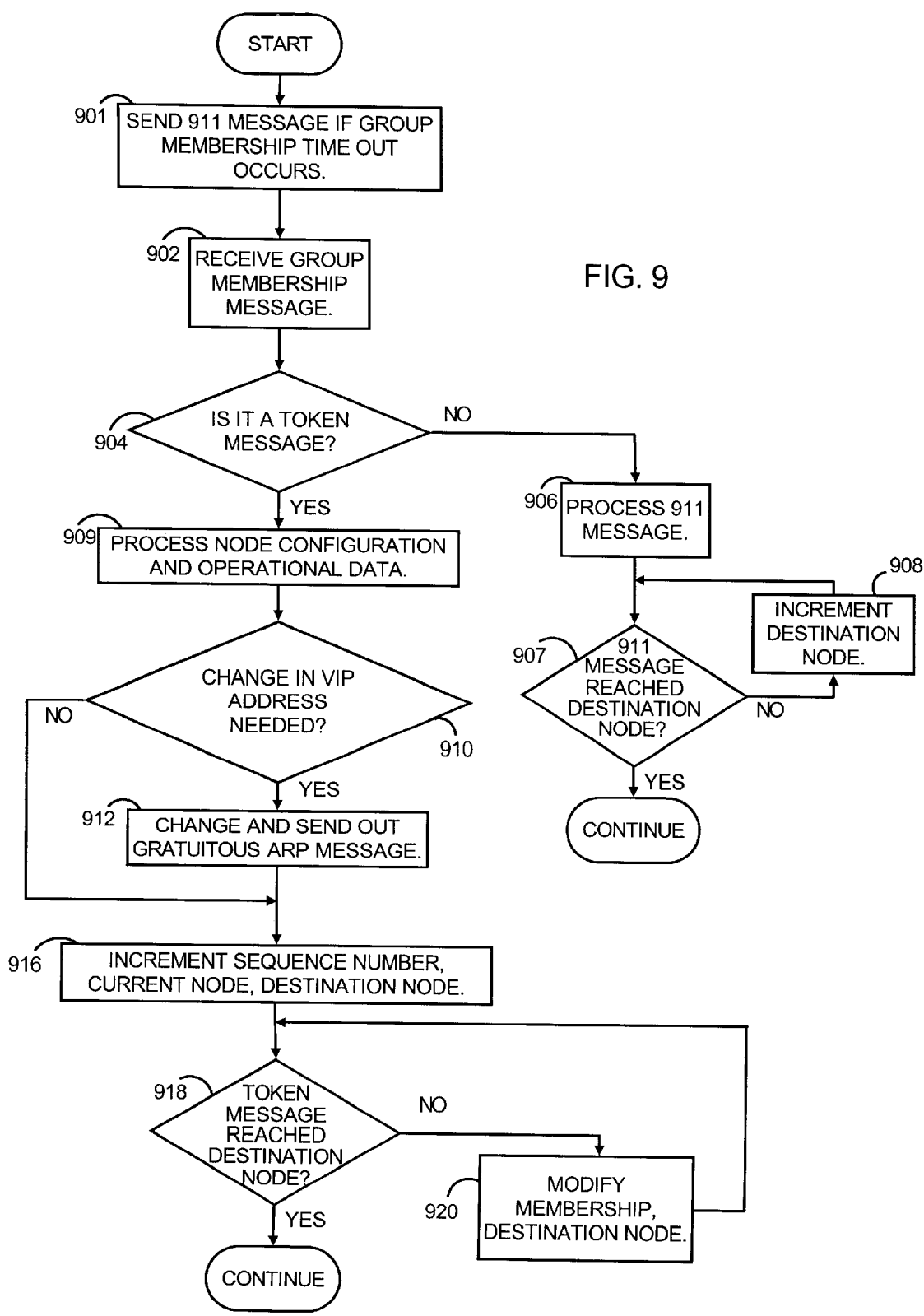
FIG. 9 is a flow diagram that shows details of the group membership message processing performed by each of the distributed server cluster computers of FIG. 3.

FIG. 9 is a flow diagram that illustrates the Group Membership message processing performed by each of the distributed server cluster computers of FIG. 3 during normal operation, as a node in a cluster. In general, for the distributed server cluster application software, a token acts as a failure detector. Therefore, if a token does not reach the specified destination node from a current node, the current node will assume the destination node is down. As a result of not receiving an acknowledgment, the current node will modify the group membership information on the token accordingly, and will send the token to the next node in the subnet cluster, past the previous destination node. In contrast to the token processing described above, a "911" message will not modify the membership on the token when the destination cannot be reached. It will simply increment the destination node, and send to the next node in the subnet ring. This processing is illustrated in FIG. 9, as explained further below.

First of all, if a node has not received a Group Membership message from another node for greater than a time-out interval, then the node will send out a "911" notification Group Membership message, as was described above in conjunction with FIG. 7. This processing is represented by the flow diagram box numbered 901. In the next step of normal message processing, represented by the FIG. 9 flow diagram box numbered 902, the node receives a Group Membership message. The node next determines whether the message is a token message or a "911" notification message, by examining the signal type message field described above in conjunction with FIG. 7. If the message is not a token message, then it is a "911" message, a negative outcome at the decision box numbered 904. As indicated by the flow diagram box numbered 906, the node will process the "911" message to examine the sequence number, determine if the sequence number it has is greater than the received sequence number, and process the permission flag. The node may determine that the "911" message is one that it sent, in which case it may need to regenerate the last token message it sent (if permission="TRUE"). In that case, it will regenerate the token, and put the message, token back out onto the subnet. If it did not send the "911" message, then the node will determine if it has a sequence number greater than that in the message. If it has a higher sequence number, it will set the permission flag (FALSE) accordingly, and send the message back out onto the subnet. If the node does not have a higher sequence number, it does not change the permission flag setting, and the sends the message onto the subnet to the next node.

Whether or not the originating node changes the permission flag, it waits for an acknowledgment from the next node (the destination node) after sending the "911" message back out onto the subnet. This is represented by the decision box numbered 907. If the originating node receives a response, an affirmative outcome at the decision box numbered 907, it continues with normal processing. If the originating node does not receive an acknowledgment response within the timeout interval, a negative outcome at the decision box 907, then the originating node increments the destination node in the "911" message to skip the non-responsive node on the subnet, and sends out that modified "911" message. This processing is represented by the flow diagram box numbered 908. The originating node then waits for that new destination node to respond, in accordance with the decision box 907.

Token failure detection generally assumes that failure to receive an acknowledgment within a predetermined time interval indicates that a message never reached the destination node, and therefore assumes that the destination node is down. Such failure detection is not totally reliable, however, as a failure to respond within the time interval may simply indicate a slow node. Thus, in an asynchronous network environment, a reliable failure detector is virtually impossible to build, since one cannot tell a "dead" or down node from a "very slow" node. Under operations of the distributed server cluster application software, however, if a "slow node" is mistaken for a "dead node" and is deleted from the list of active nodes, then the slow node will rejoin the cluster automatically. This is accomplished because of the following sequence of events: When a slow node is waiting for the token to arrive, its timeout interval will expire. That node will then send out a "911" message, thinking that the prior node is down. The "911" message will be regarded by the other nodes as an add request to join the cluster, and that slow node will effectively be added back into the distributed server cluster.

If the received Group Membership message is a token message, an affirmative outcome at the decision box 904, then the node processes the information contained in the message. This processing is represented by the flow diagram box numbered 909. Thus, changes in VIP address assignments may be received, or changes in such assignments may need to be implemented, in response to load information in the operational data. At the decision box numbered 910, the node may determine that a change in VIP address assignment is needed. The node may make this determination, for example, if the load level it is experiencing, or if the load level it sees another node experiencing, exceeds a predetermined byte rate load level limit.

Thus, individual nodes in a cluster may observe the configuration and operational data in a token message and recognize that another node in the cluster is receiving a sufficiently great amount of data traffic, due to its VIP address assignments, that the performance of the cluster as a group could be improved if the load of the other node is reduced. If that is the case, then the message processing node that has received the token message and has observed the need for reassignment will proceed with a VIP address reassignment in which the processing node will reassign one or more VIP addresses from the overloaded node to itself, or even reassign VIP addresses from itself to another node. For example, each processing node that recognizes an overloaded condition may take one additional VIP address assignment. If the next node that receives the token message sees that the overloaded condition still exists, it will take another VIP address assignment for itself. In this way, dynamic load balancing will occur during real time operation of the cluster.

If the processing node determines that a reassignment of VIP addresses is needed, an affirmative outcome at the decision box 910, then the node will implement whatever reassignment its processing dictates by changing the VIP address data in the Group Composition field 708 (FIG. 7) of the token message. Whenever there is a new or changed VIP address assignment, the node making the change sends out the ARP message mentioned above in connection with startup processing. Unlike the startup processing, however, this ARP message occurs during normal processing, and is prompted not by startup processing but by the desire to change assignments and inform the other nodes. The message is therefore referred to as a "gratuitous" ARP message. This processing is represented by the flow diagram box numbered 912. Those skilled in the art will understand that each machine connected to a subnet includes an ARP cache that contains data to translate logical IP addresses into physical MAC addresses, and will further understand that an ARP message is a message that is sent out over a network and is automatically processed by any computer communicating with that network to store the ARP message information into the ARP cache of the computer. The clients and routers on the subnet will receive the ARP message and will then automatically refresh their respective ARP caches with the new assignment information. All such processing is incorporated into the processing of the flow diagram box numbered 912.

After the token message is processed, with or without VIP address changes, the node increments the sequence number and changes the current node and destination node data fields of the message, as described above with respect to FIG. 7. The node then sends the token message back out on the subnet to the next node. This processing is represented by the flow diagram box numbered 916.

After the originating node sends the token message onto the subnet, it waits for an acknowledgment from the destination node. If the originating node receives a response, an affirmative outcome at the decision box numbered 918, it continues with normal processing. If the originating node does not receive an acknowledgment response within the timeout interval, a negative outcome at the decision box, then the originating node modifies the active membership list for the cluster to delete the non-responsive node, then increments the destination node number on the subnet to skip the non-responsive node, and sends out that modified token message onto the subnet. This processing is represented by the flow diagram box numbered 920. The originating node then waits for that new destination node to respond, in accordance with the decision box 918.

6. Graphical User Interface

The software to implement the distributed server cluster processing described above (the Application Wrapper module of FIG. 4) is installed into program memory of a computer that is to become part of a distributed server cluster in accordance with the invention. In the preferred embodiment, the software provides a graphical user interface (GUI) in both the program setup mode and in the program operational mode. Thus, a user will be shown GUI display screens to guide the user through setup and operation. Those skilled in the art will be familiar with GUI display screens and the manner in which they are created, displayed, and manipulated by users.

FIG. 10 is a representation of a GUI setup screen 1000 as shown on the display device of the FIG. 6 computer, in accordance with the present invention, for setting up primary IP addresses of the distributed server cluster. The setup screen of FIG. 10 appears on the user computer display as a window when the setup program of the Application Wrapper (FIG. 4) is launched. As FIG. 10 indicates, the setup program of the distributed server cluster first asks the user to set up the internal IP addresses (the primary IP pool) for each computer that will be a part of the distributed server cluster. In the exemplary data of FIG. 10, the cluster has four IP addresses, represented by (1.1.1.1), (1.1.1.2), (1.1.1.3), and (1.1.1.4). These IP addresses are entered into an IP address list box 1002 one by one after the user enters them into a text box 1004. The IP addresses can be added and deleted by using the Add 1006 and Remove 1008 buttons of the setup window. When the numbers in the primary IP address pool have been entered, the user is ready for the next setup window, to which the user proceeds by selecting the Next button 1010.

Figure 11:
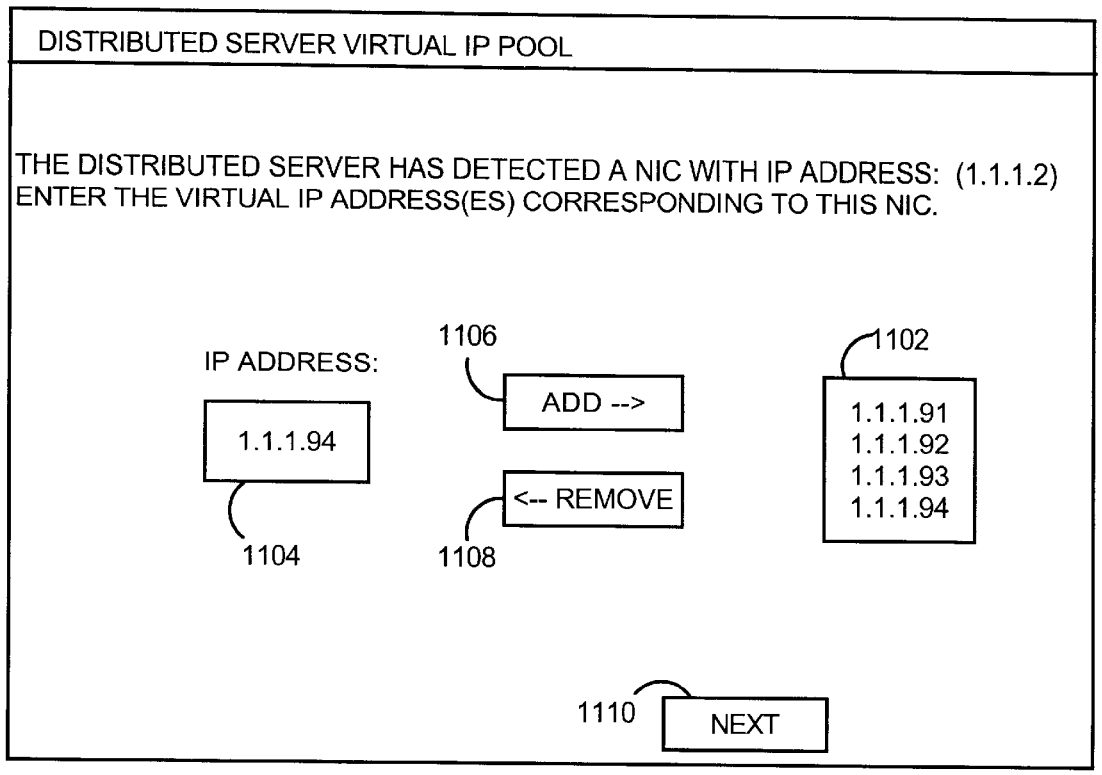
FIG. 11 is a representation of a GUI setup screen as shown on the display device of the FIG. 6 computer, in accordance with the present invention, for setting up virtual IP addresses.

FIG. 11 is a representation of a GUI setup screen 1100 as shown on the display device of the FIG. 6 computer, in accordance with the present invention, for setting up virtual IP addresses. After the addresses of the primary IP address pool have been set, the setup program must next process the virtual IP address pool. When the user selects the Next button 1010 from FIG. 10, the distributed server cluster program initiates a system check for network interface (NIC) cards. In the example of FIG. 11, the program has displayed a message in the virtual IP (VIP) address setup window 1100 that indicates finding a NIC with an IP address of (1.1.1.2). It should be understood that the system check will find each NIC that is installed into the node computer, and that FIG. 11 simply illustrates one of the display windows that will be shown during the entire setup process.

The FIG. 11 display window 1100 indicates that the user should now enter the virtual IP address pool of addresses that will be associated with the NIC that has a primary IP address of (1.1.1.2). As indicated in the virtual IP address list box 1102, the subnet virtual IP addresses for this NIC will be (1.1.1.91), (1.1.1.92), (1.1.1.93), and (1.1.1.94). These addresses will be entered by the user with the virtual IP address text box 1104 and the Add button 1106 and Remove button 1108. The user must enter the virtual IP addresses for each machine being configured. It should be apparent that the list of virtual IP addresses should be the same for each machine on the subnet. It also should be clear that each subnet will have a set of virtual IP addresses entered for it, for both the external subnet(s) and the internal subnet(s).

After the setup procedure has been completed, the user must input the configuration parameters for the cluster. Configuring the distributed server cluster in accordance with the invention involves modifying the configuration files first described above. In a conventional window programming environment, for example, these files include a node map configuration called "nodemap.cfg" that will list the primary IP addresses for the server cluster machines. Another configuration file is "vip.cfg", which determines the virtual IP addresses in the VIP address pool for each subnet connected to the cluster. These configuration files contain configuration data in a text format, in which the IP addresses are simply listed, for example. The distributed server cluster application will know the nature of the data contained in each configuration file because the file names are predetermined. For example, a standard windowing operating system (such as "Windows NT" by Microsoft Corporation of Redmond, Wash., USA) will process a file name with a ".cfg" suffix as a text file, containing characters of a standard ASCII alphanumeric set. The configuration file contents may be easily edited by the user, using a command line editor utility of the distributed server cluster or other suitable utility.

For example, the "vip.cfg" file may contain the text data shown below in Table 2:

TABLE 2

| virtual IP Pool | |
|---|---|
| VIRTUAL_IP | 131.143.36.0 { |
| | 131.143.36.91, |
| | 131.143.36.92, |
| | 131.143.36.93, |
| | 131.143.36.94 |
| | } |

In addition to the node map and the VIP address list, optional configuration files include the local monitor configuration file "localmonitor.cfg", which is used for specifying fault detection behavior of the machine. As described more fully below, the monitor functions that can be specified includes parameters for triggering monitoring of local NIC's, monitoring of the application, and monitoring of the remote hosts/router combination via the "Ping" protocol.

The NIC monitoring function tests the network interface cards in the local machine to determine if the cards are still functioning properly. The system can set this parameter to a default value. Details of the testing for NIC functionality will depend on the NIC being used, and will be understood by those skilled in the art.

Monitoring of the remote hosts/router involves testing the application for proper operation. In the case of a firewall or filter application, the testing would involve generating "dummy" packets and checking to see if the filter rejects or accepts such packets, based on the rules required by the filter application. That is, the distributed server cluster software (the Application Wrapper of FIG. 4) would interface with the Application (FIG. 4) to periodically generate predetermined dummy packets of a type that should be accepted by the filter Application, and that should be rejected by the filter. The distributed server cluster software would then report the results as part of the GUI, as described further below.

Details of interfacing the distributed server cluster software with the server software will depend on the server software being used. Those skilled in the art will understand how to implement such an interface, in accordance with the description herein. To properly interface the two applications, the default server cluster of hosts or routers external to the distributed server cluster should be set to one of the IP addresses from the external virtual IP address pool for the subnet of that host or router, and the default server cluster of hosts or routers internal to the distributed server cluster should be set to one of the IP addresses from the internal virtual IP address pool for the subnet of that host or router.

The use of the "Ping" function to monitor the remote host/router will be apparent to those skilled in the art, where the distributed server cluster software will assume that a remote host/router is not functioning properly if it does not respond to a conventional "Ping" message within a predetermined time interval. In accordance with the invention, the Ping function may be activated and deactivated by setting a parameter in the "localmonitor.cfg" file, such as by inserting an "enableMonitor( )" entry into the text file and inserting an IP address to be pinged by using an entry of the form "addMachine(IP address)". The function may be deactivated by including a "disableMonitor( ) entry into the text file By editing the configuration file, a user may directly set and modify operating parameters of the distributed server cluster. Alternatively, the distributed server cluster software may permit changing one or more of the parameters through the GUI display screens, as described further below.

Figure 12:
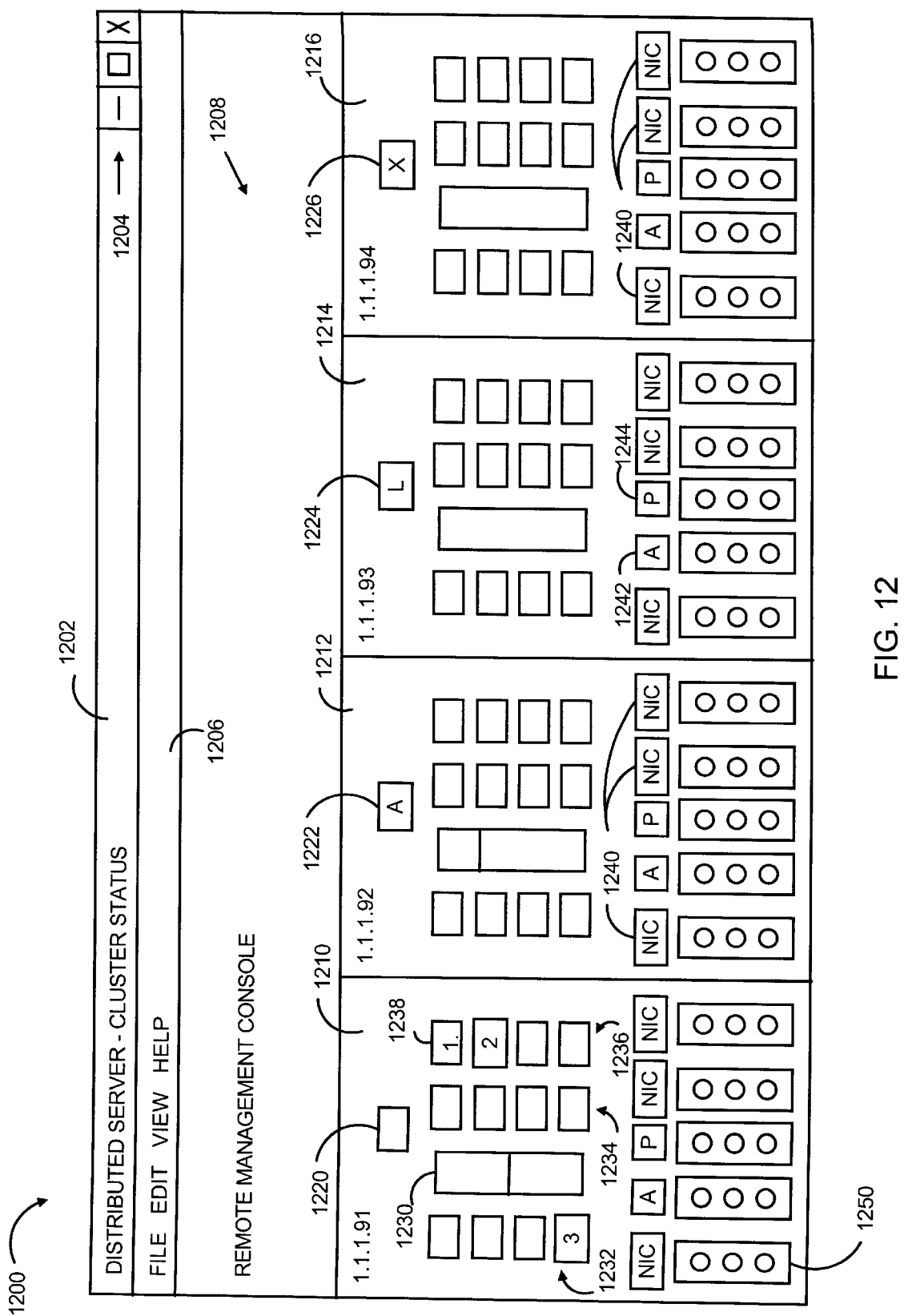
FIG. 12 is a representation of a GUI screen as shown on the display device of the FIG. 6 computer, in accordance with the present invention, for a Remote Management Console screen for running the distributed server cluster from a remote computer.

FIG. 12 is a representation of a GUI screen 1200 as shown on the display device of the FIG. 6 computer, in accordance with the present invention, for a Remote Management Console screen for running the distributed server cluster from a remote computer. The Remote Management Console is generated by the distributed server cluster application software and permits setting operating parameters of the distributed server cluster, as well as monitoring the functioning of the server cluster. The screen 1200 shows the status of a single machine in the distributed server cluster, selected in accordance with a secure procedure described further below.

The Remote Management Console screen 1200 is shown on the display device of the computer (FIG. 6) and, in accordance with a window operating system for a GUI, includes conventional program window artifacts. Thus, the display screen includes a window title bar 1202 across the top of the screen with window sizing icons 1204. A menu bar 1206 provides a means for selecting user actions, such as opening files, editing file contents and system parameters, changing the display details, and requesting help information. The lower part of the display screen 1200 includes a graphical representation of the server cluster machines 1208.

Each respective server cluster machine is represented in the Remote Management Console screen 1200 with a separate area. For example, in the illustrated embodiment, there are four virtual IP addresses for the machine being monitored, comprising (1.1.1.91), (1.1.1.92), (1.1.1.93), and (1.1.1.94). Thus, these four VIP addresses are represented by four separate screen areas 1210, 1212, 1214, 1216 containing various icons. In the preferred embodiment, the exact shape and theme of the icons can be selected by the user. A general boxed shape is used in the drawing figures, for simplicity of presentation. Where details of one screen area 1210, 1212, 1214, 1216 are provided, it should be understood that the explanation of such details also applies to the other display areas of the Remote Management Console display screen, as all of them are capable of showing the same information.

A Server cluster icon 1220 shows the overall status of the particular distributed server cluster machine, indicating whether the machine is operational for the virtual IP address and indicating which global options are enabled. In one standard representation form of the icon 1220, the icon indicates that the distributed server cluster is fully functional. If an automatic rejoin feature is enabled, the Server cluster icon includes an "AUTO" or "A" indication 1222. When automatic rejoin is enabled, the distributed server cluster machine will attempt to rejoin a cluster after recovery from an error condition that has resulted in a failed machine. The error condition may comprise a failed NIC, a failed application, and the like. In the preferred embodiment, the automatic rejoin feature is enabled as a default condition. In another option, a load balancing feature may be selected. Load balancing is indicated with a suitable Server cluster icon display feature, such as "L.BAL" or "L" 1224. If load balancing is selected, the distributed server cluster application will move virtual IP addresses from machines with higher traffic loads to machines with lower traffic loads, automatically during normal operation. Load balancing is enabled as a default condition. Finally, the Server cluster icon indicates a failed or closed server cluster virtual IP address with a suitable "CLOSED" or "X" icon 1226. A user may edit the condition of a server cluster and force the server cluster condition to be closed, in which condition it will remain until the user opens the server cluster again.

In each server cluster VIP address screen area 1210, 1212, 1214, 1216, a load bar 1230 shows the current byte traffic load being handled by the machine. The load bar is colored in a vertical "thermometer scale" reading to indicate traffic load, preferably on a logarithmic scale. If a user places the display cursor stationary over the load bar, the GUI will display the numerical value of the traffic load, after a predetermined time interval. On either side of the load bar 1230, columns of IP icons represent the virtual IP numbers managed by a particular machine. Each icon indicates a particular IP address of the internal or external VIP address pool. In the first screen area 1210, for example, the IP icons 1232 to the left of the load bar 1230 represent the internal VIP addresses, and the IP icons 1234, 1236 to the right of the load bar represent the external VIP addresses. A number or character in an IP icon 1232, 1234, 1236 indicates an IP address that is being managed or handled by the respective machine 1210, 1212, 1214, 1216. A blank icon indicates no assignment.

In accordance with the GUI and system operation, any VIP address can be set to stay on a particular distributed server cluster machine by dragging and dropping the IP icons 1232, 1234, 1236 from a machine in one of the screen areas 1210, 1212, 1214, 1216 to a machine in a different one of the screen areas. It should be understood that the GUI will not permit dragging and dropping an IP icon from an external VIP area to an internal VIP area. When an IP icon is moved from one machine area to another, the IP address associated with the IP icon is moved to the new machine. If a user affirmatively moves an IP icon, the distributed server cluster application will automatically set the "Preference" flag (described above with regard to the setup procedure) and will change the IP icon to indicate the setting of the "Preference" flag, such as by adding a red dot 1238 to the IP icon. As noted above, an IP address for which the user has indicated a preference assignment (either in setup or by dragging and dropping) will be moved by the distributed server cluster application only if the preferred machine fails, or if the preference is removed by the user.

In the preferred embodiment, the GUI permits a user to set and change the VIP address options for a machine by using a conventional display mouse and right-clicking the display mouse when the display cursor is placed over an IP icon. The action of right-clicking causes the GUI to display a preferences menu that permits setting and removing an IP address preference. Setting the IP preference in this way means that the current machine assignment is the preferred assignment for the VIP address, so that the red dot 1238 will show.

Below the load bar 1230 and IP icons 1232, 1234, 1236 in each display screen area 1210, 1212, 1214, 1216 are placed local monitor icons and condition icons that indicate the status associated with the local monitor components. The local monitor icons include a NIC Load icon 1240, an Application Condition icon 1242, and a Ping icon 1244. Each local monitor icon is an identifier that is associated with a condition icon placed directly below it. The condition icons illustrate three different condition levels for their respective associated components and are represented in the preferred embodiment as a traffic signal display.

For example, the NIC Load icon 1240 indicates that the traffic signal 1250 with which it is associated shows the status of the network interface card to the indicated subnet, or the status of the link for that card to the subnet. A red traffic signal (or top-most icon display indication) indicates that the distributed server cluster software has detected that the NIC is not functioning properly. A yellow traffic signal (or mid-level icon display indication) indicates that the NIC is not being monitored by the distributed server cluster software. That is, the NIC load monitoring feature is either disabled or not supported by the installed software for this component. A green traffic signal (or lower-most icon display indication) indicates that the NIC is functioning properly.

Similarly, the Application Condition icon 1242 indicates that the traffic signal icon 1252 with which it is associated shows the status of the application on the local machine. A red traffic signal indicates that the distributed server cluster software has detected that the server is not functioning properly, a yellow signal indicates that the server is not being monitored by the software, and a green signal indicates that the server is functioning properly. The Ping icon 1244 indicates the status of the ping remote monitor. Thus, a red signal indicates that no timely ping response was received, a yellow signal indicates that the Ping feature is not being monitored, and a green signal indicates that the last ping response was timely received.

The operation of any one of the particular local monitor components 1240, 1242, 1244 can be enabled and disabled by right-clicking on the traffic signal icon for the desired component. Enabling the monitor means that the given component (NIC, application, or ping) will be monitored. If the component is functioning properly, the associated traffic signal icon will be set to green when the component is enabled in this way. If the component has failed, the traffic signal will be set to red. If the component cannot be monitored, such as where a NIC is incompatible with the monitor software, the traffic signal will be set to yellow when the component is enabled in this way.

The features and appearance of the user interface presented to the user may be changed from the description above, without departing from the teachings of the invention.

7. Remote Monitoring

As described above, the Remote Management Console display 1200 permits changing and monitoring the distributed server cluster through the GUI. In accordance with the Remote Management Console and the operation of the distributed server cluster software, the cluster can be changed and monitored as described above from any one of the cluster machines, and from a suitably configured remote machine external to the cluster. More particularly, a remote machine can be used if it can communicate with a machine of the cluster and if it has access to the appropriate GUI graphical components. Access to the GUI components can be achieved either by installation of the distributed server cluster software on the remote machine, or if the appropriate GUI components can be delivered to the remote machine during the cluster monitoring. Such remote monitoring will first be enabled from a machine of the cluster using the Edit menu of the Remote Management Console screen.

Figure 13:
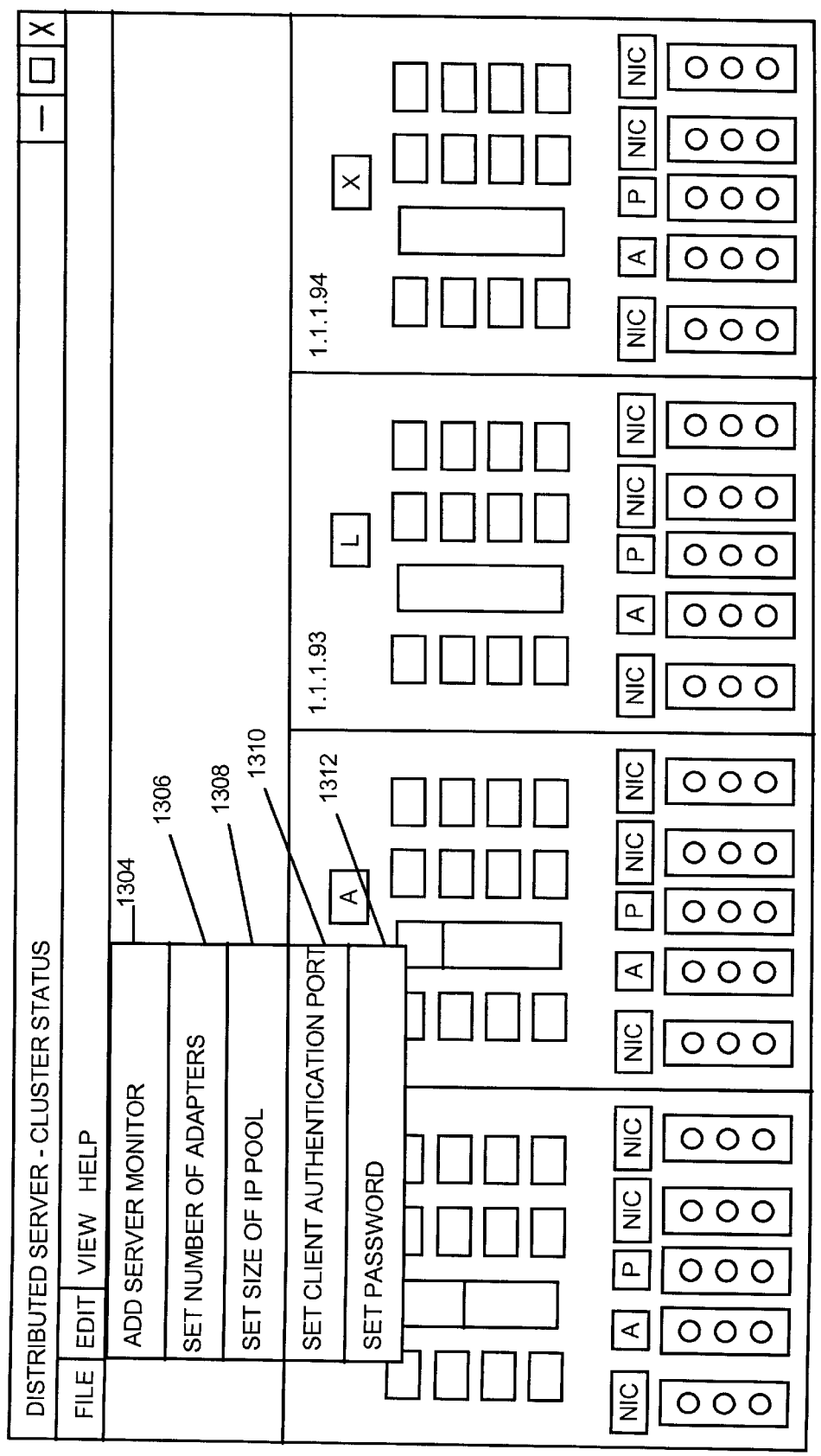
FIG. 13 is a representation of the Remote Management Console screen of FIG. 12, showing the Edit menu for entry of cluster configuration data.

FIG. 13 is a representation of the Remote Management Console screen 1200 of FIG. 12, showing the drop-down Edit menu selections. FIG. 13 shows the screen after a user has selected the Edit menu from the menu bar 1206 and caused the Edit menu 1302 to drop down from the menu bar. The menu selections include Add Server cluster Monitor 1304, Set Number of Adapters 1306, Set Size of IP Pool 1308, Set Client Authentication Port 1310, and Set Password 1312. It should be noted that the first time the Remote Management Console is displayed after the distributed server cluster software is installed, the details of the machines in the cluster will not be observed. Thus, neither a machine of the cluster or a remote machine may obtain the monitoring information from the display. The Edit menu 1302 must be selected and parameters set to enable monitoring of the cluster machines, as described below.

The Add Server cluster Monitor function permits a user to enter a primary IP address for each server cluster machine to be monitored. One IP address will be entered for each machine in the cluster. Ordinarily, the IP address of each machine in the cluster will be entered, so that each machine can be monitored. The Number of Adapters function is for entering the number of NICs to show for each machine. The default number of NICs is two, for a minimal cluster configuration, as this indicates connection of the machine to one external subnet and one internal subnet. The user entry in the Number of Adapters should match the number entered for the setup value, in the setup procedure described above.

The Set Size of IP Pool function permits a user to enter the size of the IP address pools, with a default number of four. This value defines the number of IP addresses managed by the distributed server cluster on each subnet. The Set Client Authentication Port function involves connecting via a telnet operation to a port on the Application machine. This ensures communication between the distributed server cluster software and the application software with which it works.

The Set Password function provides a means of authenticating a user who wishes to gain access to the cluster monitoring information. The password entered here will be used to permit a remote user to communicate with a machine in the cluster. It should be noted that this authentication password does not guarantee access to the distributed server cluster software and to information from the Remote Monitoring Console. Rather, a separate cluster password is necessary, in addition to the authentication password. The cluster password is preferably set only by a user at a cluster machine, using a local administrative utility program of the distributed server cluster software. In the preferred embodiment, the distributed server cluster software provides a "Change Service Password" option from the software "Start" menu that, when selected from a cluster machine, permits an authorized user to set the cluster password. In this way, a setup user specifies a password that must be provided when connecting to the cluster.

Finally, the distributed server cluster software includes a command line interface utility program that provides an alternative to the GUI. The command line interface permits the same control as the Remote Monitoring Console of the GUI. That is, just as an authorized user may remotely connect to a cluster machine and view the GUI display to determine the status of the cluster, an authorized user may remotely connect to a cluster machine and receive cluster status information from a text-based, command line interface. The command line interface will appear in a text window, in a conventional manner that will be familiar to those skilled in the art.

In the preferred embodiment, the command line interface will report the local status of the machine to which a remote user connects or of the local machine at which a user has invoked the command line interface, and will also report on the global status of the cluster. The global status information may be retrieved by connecting to any machine of the cluster. In addition, a remote user may move VIP address assignments from one machine to another by connecting to any machine of the cluster. It should be noted, however, that the command line interface will return a success indication (that is, a no error condition) if the command from the remote machine is successfully communicated to the cluster machine, but the command line interface does not determine if the remote machine actually carries out the requested action. Such information is available when communicating with the GUI.

Thus, the distributed server cluster constructed in accordance with the invention dynamically reconfigures traffic assignments among multiple machines for increased network availability. The distributed server cluster moves traffic assignments among the multiple machines if one of the server cluster machines becomes unavailable, such that network availability is substantially unchanged. The machines of the distributed server cluster communicate with each other such that automatic, dynamic traffic assignment reconfiguration occurs in response to machines being added and deleted, with and no loss in functionality for the server cluster overall, in a process that is transparent to local network users, thereby providing a distributed server cluster functionality that is scalable. Each machine of the server cluster can advantageously continue with its operational functions, such as operating software, while participating in the distributed server cluster and dynamic reconfiguration processing. In this way, the invention substantially maintains network availability regardless of machine failures, so that there is no single point of failure and no lapse in server cluster functionality.

The features and appearance of the user interface presented to the user may be changed from the description above, without departing from the teachings of the invention.

B. Server Cluster Functionality

A network server cluster constructed in accordance with the present invention includes multiple servers, also called traffic control computers, that function as a front server layer between the network and a back-end server layer that includes multiple machines functioning as Web file servers, FTP servers, or other application servers. The front-layer servers provide a scalable, distributed, highly available, load balancing server system that performs fail-over and dynamic load balancing for both server layers. The front-layer servers achieve their unique functionality with a dynamic reconfiguration protocol that permits reassignment of network addresses to the front layer machines and supports state information sharing and CPU load information sharing among the front-layer servers. To provide such functionality, the front-layer servers utilize a token scheme in an expanded format compared to that described above.

The server cluster configuration and address assignment are achieved through the operation and protocol word scheme previously described. As noted above, a variety of unique server functional features are provided by a server cluster constructed and operated in accordance with the invention. The unique server cluster functional features will be described next.

1. Improved State Sharing

Consistent state sharing among the servers in the cluster is important for the distributed server application in accordance with the invention. In this embodiment, the Group Membership Protocol Word described above in Section A is expanded and generalized to create a general Consistent State Sharing scheme. This Consistent State Sharing mechanism is reliable, has low-overhead, and serves as the core to enable other features of the front-layer distributed server system.

The foundation of the Consistent State Sharing mechanism is a Reliable Message layer that is implemented with the distributed server application software (FIG. 4). In this embodiment, the Reliable Message layer sits on top of UDP (that is, it uses UDP to send data) and comprises a module of the application software. It has an acknowledgement and automatic resend mechanism that enables reliable delivery of data. Its main differentiation with TCP is that, first, it is a connectionless protocol; secondly, it supports multiple subnet transport; furthermore, in the case of delivery failure, it calls a call-back function from the layer above it.

Upper layer software, comprising modules of the distributed server application, can send a message of any size using the Reliable Message layer. The sender-side operation of the Reliable Message layer partitions the message being sent into a number of packets. It sends all packets using UDP, creating a record for each packet as well as for the message. When the timeout of any packet expires, it resends that packet, and doubles the timeout value. After a predetermined number of resends using all possible paths, if the Reliable Message layer still fails to receive acknowledgement, the Reliable Message layer will call the callback function to notify the upper layer software, passing it the record of the original message. On the other hand, after all packets have been acknowledged by the receiver, the Reliable Message layer cleans the records for the packets and for the message by deletion. The upper layer software comprises any software calling the Reliable Message layer for messaging.

On the receiver side of the Reliable Message layer processing, for every packet received, the Reliable Message layer sends out an acknowledgement. The Reliable Message layer of a front layer server maintains a buffer in which it places the packets, until all packets for a message are received. When all packets are received, the Reliable Message layer asks the upper layer software to process the message.

Figure 22:
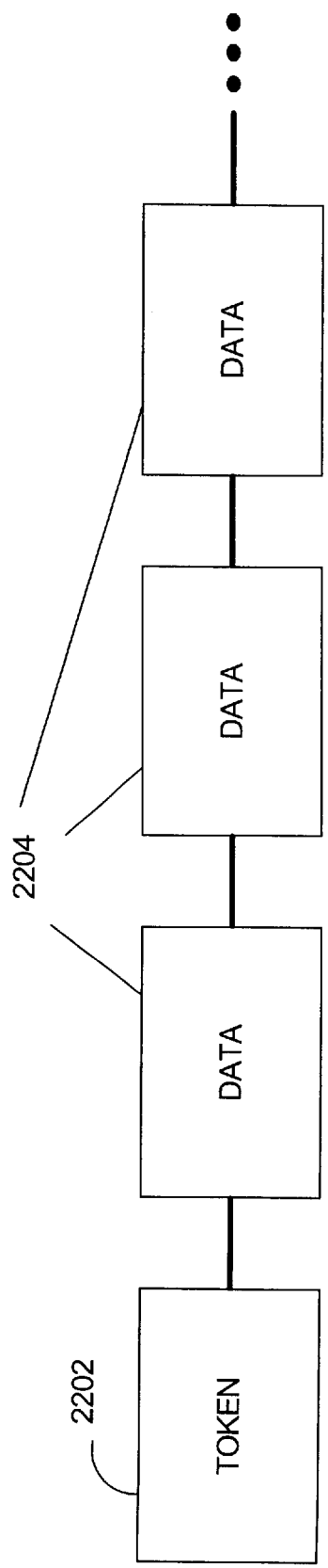
FIG. 22 is a representation of a token message train, sent by the distributed servers illustrated in FIG. 2.

With the creation of the Reliable Message layer, this embodiment provides consistent state sharing with a reliable message passing interface. In this consistent state sharing scheme, the token described in the Group Membership Protocol Word serves as the "locomotive" of a state-sharing "train". This is illustrated in FIG. 22. The "locomotive" 2202 can have an arbitrary number of data modules 2204 attached to it, like carriages of a train. This is achieved with a data field in the token header that specifies the number of data modules (carriages) associated with the token (locomotive). The token 2202, together with the data modules 2204, becomes a message. Thus, the Reliable Message layer is a means of transporting this message. This message travels in a token ring fashion around all the members of the server cluster, as described above in Section A. Each member of the server cluster can load and unload information onto or from the message train, changing the token header to specify the number of data modules, as needed.

Currently, the data that travels on the consistent state sharing mechanism described above include Virtual IP information, cluster configuration information, node fault and load monitoring information, connection information, server monitoring information. Other types of information may be added, as needed.

2. Resilient Network Connection

Generally, moving an IP address from one machine to another causes a client-server TCP connection to be lost, if the machine is an end-point of the TCP connection. Ordinarily, then, the transfer (download) of files from a server cluster over the Internet to a network user will be disrupted by an IP address reassignment, so that the transfer will have to be re-started after reassignment is completed. In accordance with the present invention, however, address reassignment can be performed dynamically with no loss in client-server TCP connection, thereby providing uninterrupted data file transfer. This is achieved with an application driver 408 (FIG. 4) that keeps track of IP address movements so that old data traffic intended for an old client-server TCP connection (that is, traffic that is part of a data file transfer initiated before address reassignment) is forwarded to the old server machine connection until the network user terminates the connection. All new traffic is maintained at the new (reassigned) server machine. In particular, the dynamic address reassignment is accomplished with the gratuitous ARP message described above, with the application driver of the server operating to send a gratuitous ARP message packet to the router upstream (Internet side) of the server, to update the ARP cache of the appropriate routers.

Figure 14:
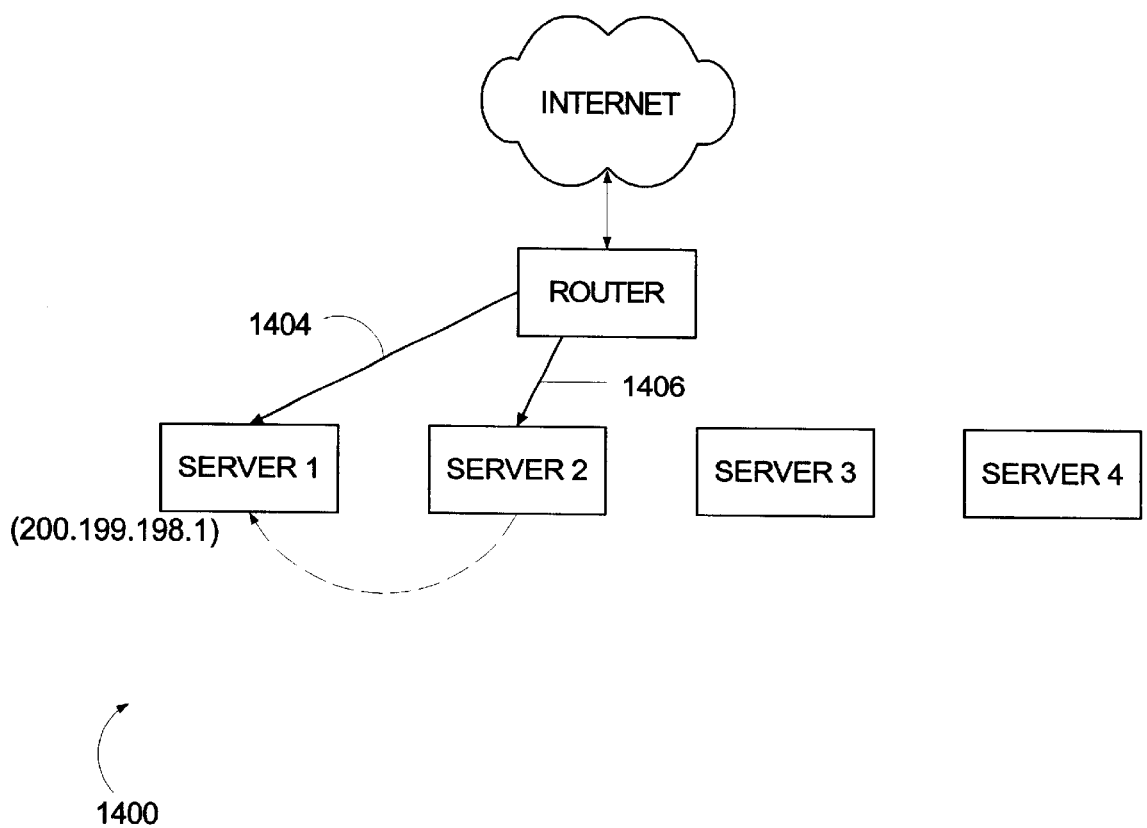
FIG. 14 is a representation of a server cluster containing distributed servers constructed in accordance with the present invention, as illustrated in FIG. 3.

FIG. 14 shows the operation of a server cluster 1400 constructed in accordance with the invention. A client 1402 communicates with Server 1 of the front layer server cluster at the IP address (200.199.198.1) assigned to the server during a TCP connection 1404. Later, an address reassignment occurs, shifting new traffic for the IP address (200.199.198.1) to the Server 2 machine in a "new" TCP connection 1406. Those skilled in the art will understand that TCP/IP connections between two machines are established following an exchange of messages including a synchronize segment message (SYN), acknowledgement message (ACK), and SYN-acknowledgement message (SYN-ACK). In more detail, Server 1 removes the IP address from itself; it will forward any new SYNs to that VIP to Server 2; it puts all data about the current TCP connection to that virtual IP on the token, and passes the token to Server 2.

Next, in accordance with this aspect of the invention, Server 2 receives the information from the token. It brings up the virtual IP interface and sends out the Gratuitous ARP message to start receiving traffic for that new virtual IP. Accordingly, when data traffic arrives at Server 2 for the IP address (200.199.198.1), Server 2 can determine from packet information of the data that the TCP connection with which the data is associated was initiated prior to the address reassignment to Server 2. Therefore, Server 2 can consult memory used by the driver to determine that the data should revert to the original connection 1404 with Server 1 rather than the current IP connection 1406. The new server machine, Server 2, therefore forwards the data relating to the original TCP connection 1404 to Server 1, as indicated by the FIG. 14 dashed line. In this way, the computers of the server cluster 1400 operate to provide a resilient network connection in which network addresses can be moved among the cluster machines without breaking network connections between clients and the servers.

Figure 15:
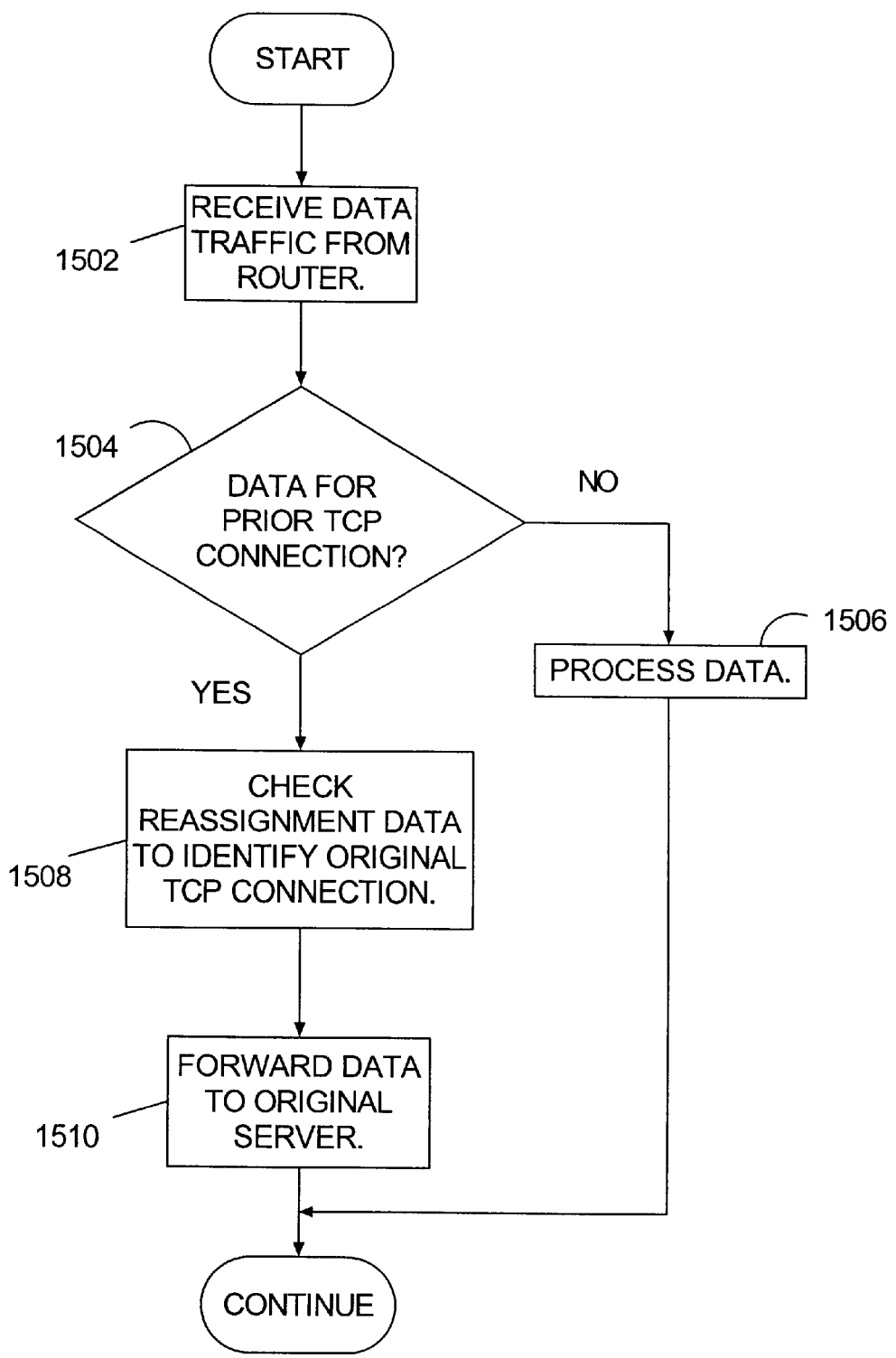
FIG. 15 is a flow diagram that shows the sequence of operations executed by the server cluster of FIG. 14 to provide a resilient network connection.

FIG. 15 shows the sequence of operations executed by the server cluster to provide processing that results in the resilient network connection. In the first operation, indicated by the flow diagram box numbered 1502, a distributed server in the server cluster receives data traffic from a router. Next, the receiving server checks to see if the data is associated with a previous TCP client-server connection, prior to an IP address reassignment. This checking is represented by the decision box numbered 1504. If the data is not related to an earlier connection, a negative outcome at the decision box, then the server processes the data traffic as per normal operation, as indicated by the flow diagram box numbered 1506. Other server processing then continues.

If the received data is associated with an earlier TCP client-server connection, an affirmative outcome at the decision box 1504, then the server checks the server reassignment data that all of the distributed servers maintain in their respective server memory and the server identifies the distributed server that originally had the assigned IP address and with which the previous client-server connection existed. This processing is represented by the flow diagram box numbered 1508. Once the original server is identified, the currently assigned and receiving server forwards the data traffic to the original server, as indicated by the flow diagram box numbered 1510. Other server processing then continues.

3. Distributed Network Address Translation

Those skilled in the art will understand that a conventional Network Address Translation (NAT) machine will be installed upstream (on the Internet side) of a gateway server cluster in the situation where the server cluster uses VIP addresses for a non-portable IP address pool. This is done, for example, where a private internal IP network is implemented to provide a "server network". The NAT machine sets one of its communication ports to the internal IP address of the server cluster and forwards client IP responses to the appropriate server machine of the cluster. The machines of the server cluster may initiate a port assignment at the NAT machine. As was noted above for conventional load balancing servers, this creates a bottleneck for server cluster traffic, with a single point of failure, and limits bandwidth of the cluster.

In accordance with the invention, NAT functionality is distributed among the machines of a distributed server cluster. Each distributed gateway of the cluster (FIG. 4) receives traffic due to the pool of virtual IP addresses in this model. Each distributed server of the front layer subnet maintains a list of port connections that it services, and shares this list with the other front layer servers via the combination of real-time UDP multicast and reliable token delivery. At the start of a new TCP connection to a downstream subnet server (away from the Internet client), the gateway informs the other distributed gateways of the gateway cluster of the connection, using the real-time UDP message as well as the reliable token train described above. Thereafter, if a distributed gateway receives a SYN-ACK packet for a TCP connection that is not in its list of port connections, that server will buffer the data packet until it receives the SYN updates from the other gateways. In the preferred embodiment, the distributed servers of the server cluster share respective server state information using the global token passing scheme described above, and therefore can provide a "distributed server NAT" functionality. The combination of the use of real-time UDP, the reliable token train, and the SYN-ACK buffer allows fast and reliable processing of every TCP connection. The load balancing on the gateway layer can be achieved by movement of virtual IPs.

Figure 16:
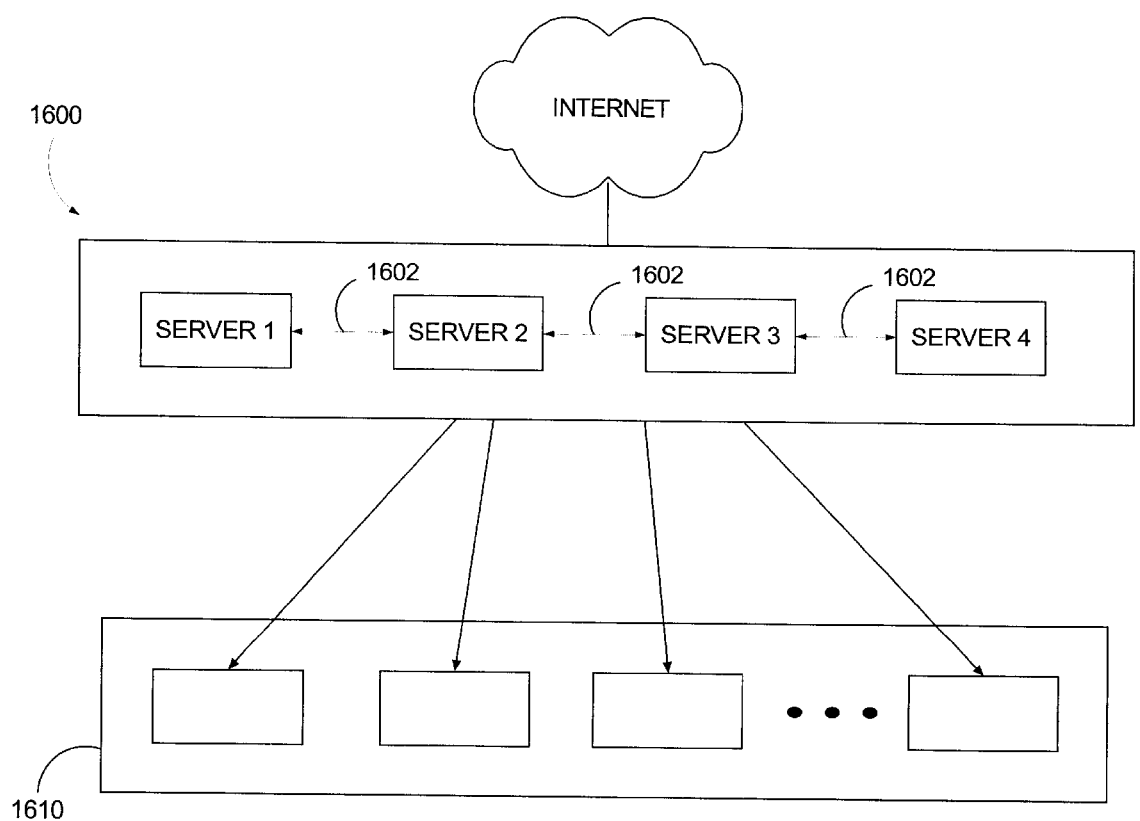
FIG. 16 shows a cluster of distributed servers such as illustrated in FIG. 14 to provide a server NAT functionality.

FIG. 16 shows a server cluster 1600 containing distributed servers constructed in accordance with the invention to provide a "server NAT", where the dashed lines 1602 indicate state sharing among the "server NAT" machines (Server 1, Server 2, Server 3, Server 4) to route data traffic to the particular server machines that have responsibility for different port communications. The "server NAT" machines comprise distributed servers constructed in accordance with the invention, and communicate with multiple conventional Web servers 1610, each of which has an assigned distributed server to which it sends data traffic, regardless of the "server NAT" from which it might have received data. In this way, the NAT function is distributed among the "server NAT" machines 1600, which share state information and can carry out reassignments to better distribute workload. Thus, each of the "server NAT" machines 1600 will forward data traffic to the particular machine connected to the port identified in a data packet received from a Web server. It should be understood that four distributed servers are shown in the server cluster 1600 for purposes of illustration, but that a lesser or greater number of distributed servers can be accommodated in the server cluster without departing from the teachings of the invention.

4. Dynamic Addition and Deletion from the Server Cluster

It is desirable to configure the servers of a server cluster as quickly and conveniently as possible. A server constructed in accordance with the present invention provides a distributed server that can be configured by a controller. In a cluster of distributed servers, the controller communicates with any one of the distributed servers for configuration control. In the preferred embodiment, the controller comprises a computer that communicates with a distributed server of the server cluster using an Internet browser application program through a secure socket layer (SSL) network communication connection. The browser provides a simple and readily accessible user interface to an access program or applet, and the SSL connection provides greater security for the Internet communication.

Through the controller's browser interface and SSL connection, a controller user can dynamically add and delete machines from the server cluster, and can configure all the machines in the server cluster to invoke particular load balancing schemes, make IP address assignments, and specify other operating parameters as described in the setup discussion above. In this way, the controller provides a convenient means of inserting legitimate configuration data for the distributed server cluster to one of the servers, and then having that configuration data automatically propagated among the other machines of the cluster, thereby configuring all of the machines.

With the cluster configuration capability described herein, a user needs to only configure one node during cluster installation, and the other nodes can receive configuration information from the first installed node automatically, thereby avoiding the risk of inconsistent configuration. There is a version control number in the configuration data file, and this data is shared via the state sharing token described above. This enforces the consistency of the configuration among all servers in the cluster.

Figure 17:
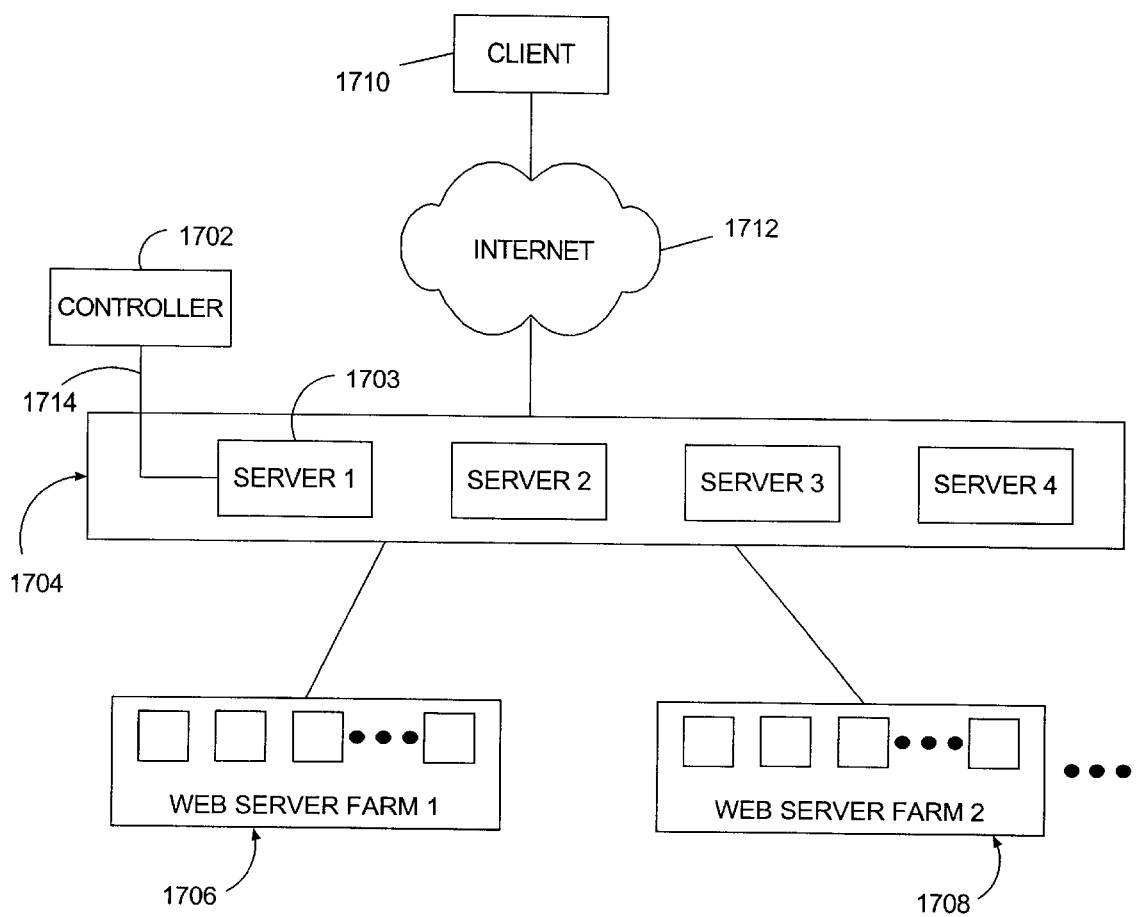
FIG. 17 shows a system in which a controller is connected to a distributed server to configure all the distributed servers in a cluster such as illustrated in FIG. 14.

FIG. 17 shows a system in which a controller 1702 is connected to one of the distributed servers 1703 of a server cluster 1704 constructed in accordance with the present invention. The server cluster services Web server farms 1706, 1708 that provide, for example, Web pages to requesting client machines 1710 through the server cluster 1704 over the Internet 1712. In the preferred embodiment, the communication connection 1714 from the controller machine 1702 to the distributed server 1703 is through the Internet via the SSL connection, but those skilled in the art will recognize that a variety of other communications links may be implemented. The controller 1702 operates to specify and control configuration settings as described above via a user interface, as illustrated in connection with FIGS. 10 through 13.

In addition, with some Web server control applications, the controller 1702 can be used to access the Web servers 1706, 1708 through the server cluster 1704, thereby dynamically configuring the Web servers. Such configuration control will be implemented according to the interface of the Web server control applications used for the Web servers 1706, 1708 after access is achieved using the distributed server control scheme of the present invention.

5. Highly Available Internet Link

Conventionally, a client may begin a download operation to receive a file from a server over a network connection after first establishing a client-server communications session. The communications session may occur, for example, over the Internet. If the client-server communications session is terminated, such as by loss of the Web server, the download operation usually must be started over. Alternatively, a client program may be installed at the client machine to enable download operations to be stopped before completion and then restarted and resumed at the prior stopping point. When the download operation is resumed, the client machine must return to the same Web server machine at the same URL. This situation can be problematic, due to difficulties in server availability, network traffic, and bandwidth limitations.

A server constructed in accordance with the present invention provides a distributed server that supports highly available links for download operations independent of a particular client browser and server connection in this way, transmission of Internet packetized data can be moved from one Web server to another during download in case of a Web server failure, without interrupting the flow of data, such that the process is transparent to client machines.

Figure 18:
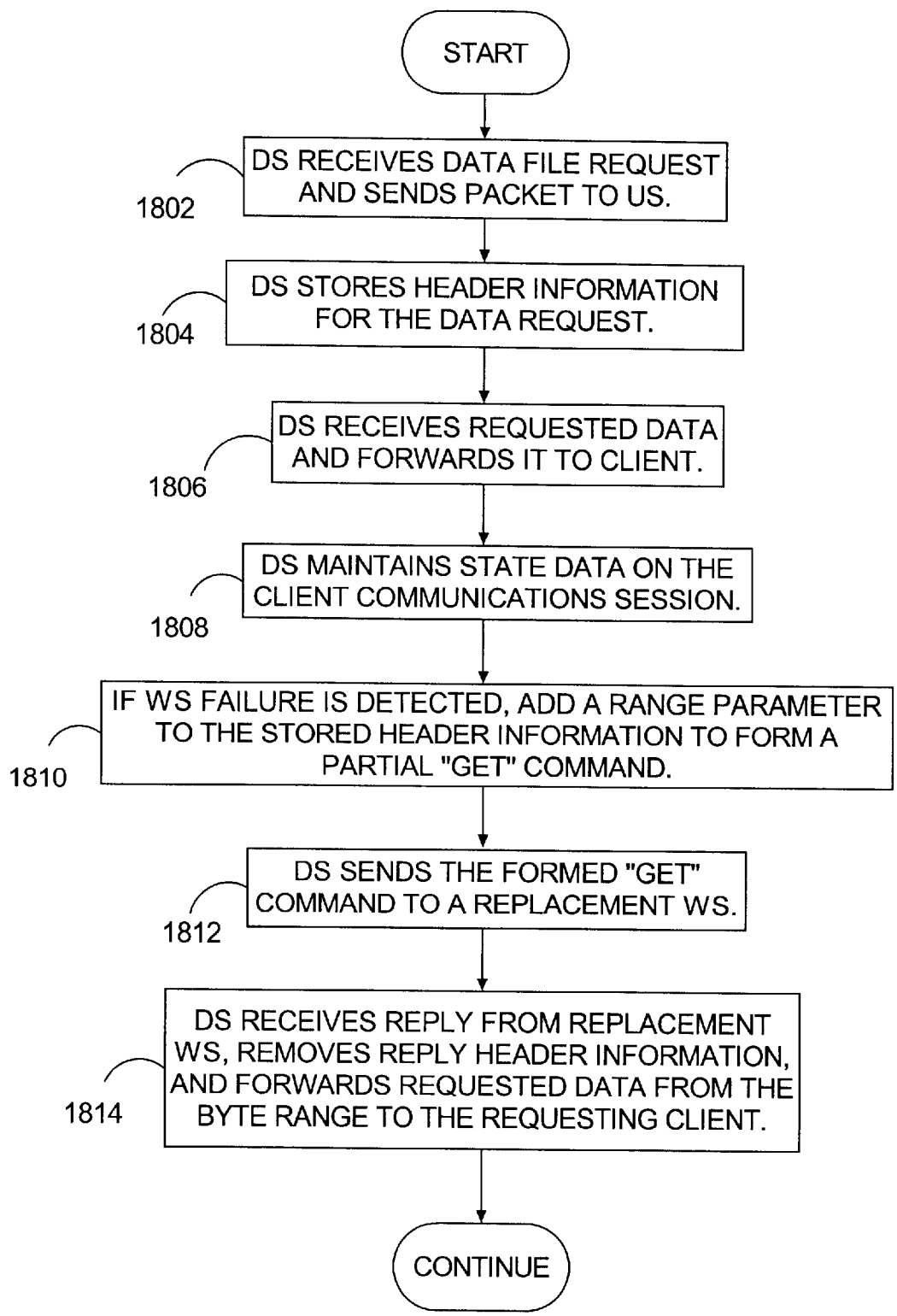
FIG. 18 is a flow diagram that illustrates the operation of a server system having distributed servers, such as illustrated in FIG. 14, to provide a highly available Internet link.

FIG. 18 is a flow diagram that illustrates the operation of a server system having distributed servers constructed in accordance with the present invention. In the first operation, represented by the flow diagram box numbered 1802, a distributed server (DS) in a server cluster receives a data file request and sends along a packet with the request information to an appropriate Web server (WS) of a server farm. The data file request may be for, as an example, a Web page for display in a browser (HTTP request) or for a file to be processed (FTP request).

In the next operation, represented by the flow diagram box numbered 1804, the distributed server stores header information for the data request. Those skilled in the art will be familiar with header information that is contained in an HTTP request and FTP request. The distributed server next receives the requested data (a packet for a Web page or for an FTP file) from the Web server and forwards it to the requesting client machine, as indicated by the flow diagram box numbered 1806. While the requested data is forwarded to the client, the distributed server maintains state data on the client communications session, as indicated by the box numbered 1808. Thus, the distributed server keeps track of the number of bytes sent to the client, the client URL, the source Web server, and the like. The communications session state data comprises a collection of data that are standard for Internet communications and will be familiar to those skilled in the art.

If the distributed server detects a Web server failure, such as indicated by a lack of an acknowledgement message, then the distributed server adds a "RANGE: byte=XXXX" parameter to the stored header information and forms a partial "GET" command according to the HTTP specification. The "GET" command is a standard HTTP specification command that requests a specified file or document from a server, and will be familiar to those skilled in the art. The "XXXX" field in the RANGE command is a range parameter that indicates the byte range of the requested document that remains to be delivered to the client, and permits the resilient link connection provided by the present invention. This operation is represented by the flow diagram box numbered 1810.

After the partial "GET" command is formed in response to Web server failure, the distributed server identifies a replacement Web server of the server farm and sends the partial "GET" command to it, as indicated by the flow diagram box numbered 1812. The partial "GET" command is a request to the Web server for the portions of the requested document or file that have not yet been delivered to the requesting client. The distributed server then receives a reply to the "GET" from the replacement Web server, removes reply header information related to the Web server, and forwards the requested data in the requested byte range to the requesting client. This operation is represented in the FIG. 18 flow diagram by the box numbered 1814. Other processing of the distributed server may then continue. In this way, a resilient network connection is provided to clients that permits communications independently of particular Web server connections, in a manner that is completely transparent to clients. In other words, in the presence of a Web server failure, no client will witness any service interruption, nor will a client need to press the "reload" button.

6. Dynamic Address Assignment without Reboot

Some server operating systems will not permit changing the IP address of a server without rebooting the server. Rebooting a server machine involves shutting down the server and reapplying power. It should be apparent that the server is unavailable while the reboot is performed, and therefore rebooting a server can cause a critical lapse of server availability and should be avoided. A server constructed in accordance with the present invention provides a distributed server that advantageously permits network address assignments to be moved from one distributed server to another of a server cluster without requiring rebooting. This is achieved by "hiding" the IP address reassignment from the server operating system (OS) software of the distributed servers. The OS may comprise, for example, the "Windows NT Server" operating system produced by Microsoft Corporation of Redmond, Wash., USA installed on the server machine.

Figure 19:
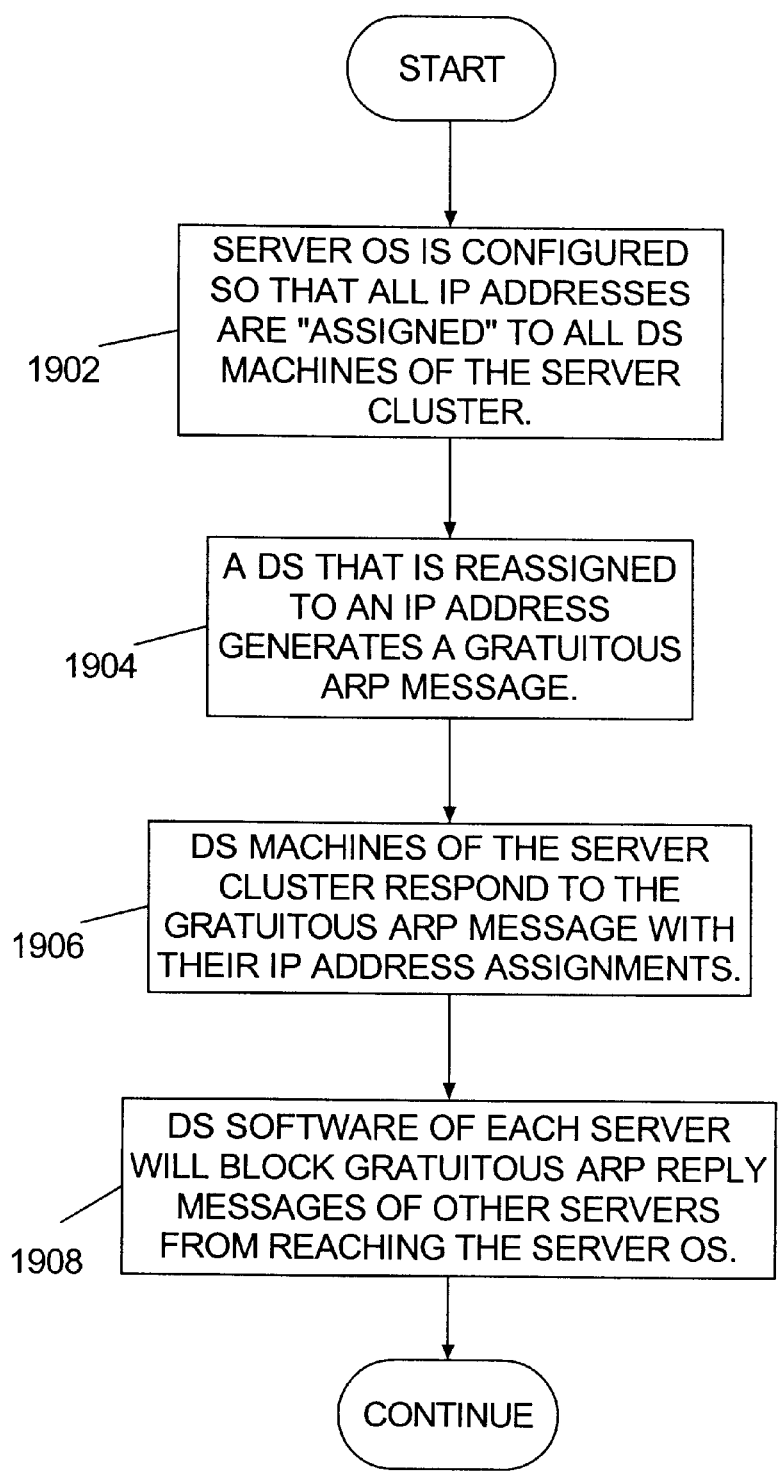
FIG. 19 is a flow diagram that shows the operating process of a distributed server constructed according to FIG. 3 to provide IP address reassignment without server OS rebooting.

FIG. 19 shows the operating process of a distributed server in accordance with the invention. In the first operation, represented by the flow diagram box numbered 1902, the server OS is configured so that all IP addresses are assigned to all distributed server machines of the server cluster. That is, the OS of each distributed server in the cluster configured upon installation such that all IP addresses to be shared are, in the view of the OS, assigned to all of the cluster servers. This permits flexibility in assigning the IP addresses to any one of the cluster servers without rebooting, because any IP address reassignment is transparent to the server OS. Thus, to the server OS, it appears that no IP address reassignment ever occurs, and therefore no rebooting is ever needed.

In the next operation, represented by the flow diagram box numbered 1904, a distributed server (DS) that is reassigned by the server application (FIG. 4) to a new IP address will generate a gratuitous ARP message, as described above. The other distributed servers of the server cluster respond to the gratuitous ARP message with their particular IP address assignment, per the description above (FIG. 9). This operation is represented by the flow diagram box numbered 1906. Lastly, to prevent OS rebooting, the distributed server application software of each distributed server will block the ARP reply messages of the cluster servers from being detected by their respective server OS, by discarding the reply messages. This operation is indicated by the flow diagram box numbered 1908. In this way, it is guaranteed that there is no IP address conflict, because each server OS is unaware of the machines having duplicate IP numbers. For each virtual IP, at any time, only one server is answering the ARP request, and therefore the mutual exclusivity of the virtual IP addresses is maintained.

7. Symmetric Traffic Routing

Another feature provided by the server system constructed in accordance with the invention (FIG. 3) is that of symmetric routing of network traffic among the cluster machines. This is advantageous because a cluster of servers may assign a distributed server to handle incoming traffic to be forwarded to a Web server farm, but that distributed server may be different from the default server that will be used by the Web server. Thus, the distributed server handling incoming traffic destined for a Web server will not be the same server that receives return responses from the Web server. This results in asymmetric traffic loading among the distributed servers, and is undesirable in some cases where symmetric routing is required. In accordance with the invention, the distributed servers of a server cluster will forward data traffic among the machines in the server cluster to ensure that data traffic enters and leaves the sever cluster from the same distributed server, thereby providing symmetric routing.

Figure 20:
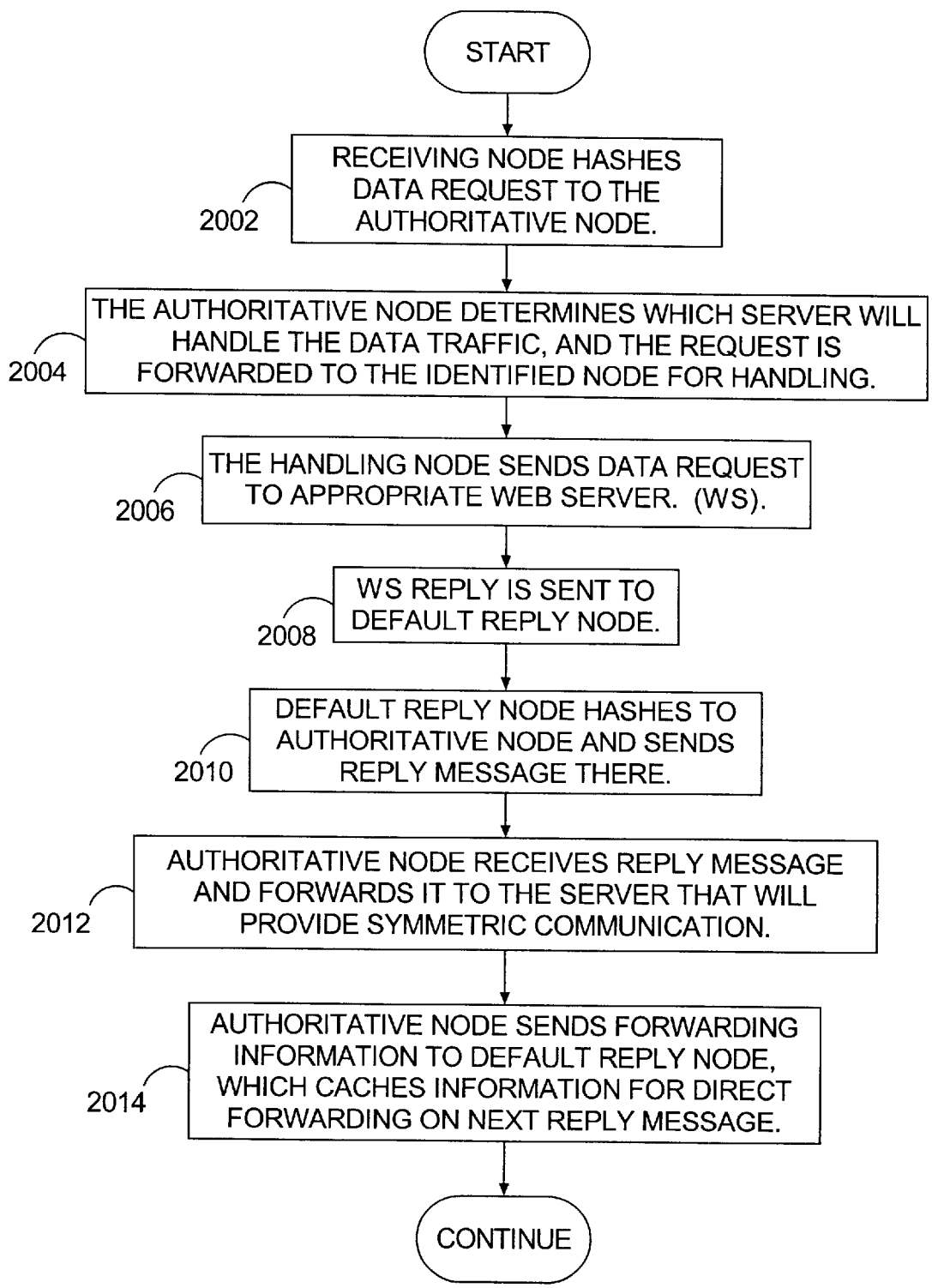
FIG. 20 is a flow diagram that shows the operation of a distributed server cluster such as illustrated in FIG. 14 to provide symmetric routing of traffic through the server cluster to a Web server farm.

FIG. 20 is a flow diagram that illustrates the operation of the server cluster to implement symmetric traffic handling in accordance with the invention. For a server cluster having distributed servers as described above, one of the distributed servers is assigned to be an "authoritative" server, or authoritative node, for the server cluster. This assignment is carried out by the front-layer server constructed in accordance with the present invention.

In the first step of operation illustrated in FIG. 20, as represented by the flow diagram box numbered 2002, a server, or node, of the server cluster receives a data request from a client machine and hashes the data request to determine which server node will be the authoritative node for the request. It should be understood that different nodes of the server cluster may be assigned "authoritative nodes" for different data requests, depending on the IP addresses (of destination Web server) involved. Once the authoritative node is identified, the data request is forwarded from the receiving node to the authoritative node. This operation comprises the operation identified by the box 2002.

When the authoritative node receives the data request, the authoritative node determines which distributed server in the server cluster will handle the data traffic associated with this request from this client to the designated Web server. When the authoritative node identifies the handling node, it forwards the data request to the identified node for handling. This operation is represented by the flow diagram box numbered 2004. Next, as represented by the flow diagram box numbered 2006, the handling node receives the data request and sends it along to the appropriate Web server for response. The Web server (WS) response is sent to a default node of the server cluster. Those skilled in the art will know that a Web server typically has a default upstream router (toward the Internet) to which it sends replies to data requests. Sending the Web server reply to the default reply node is represented by the flow diagram box numbered 2008.

Next, as represented by the flow diagram box numbered 2010, the default reply node hashes the received data request reply to the authoritative node for replies, and sends the reply message to that authoritative reply node. The authoritative reply node receives the reply message and forwards it to the server node that will ensure symmetric communication. That is, the authoritative reply node will determine the node of the server cluster that first received the data request from the client, and will forward the reply message to that node. In this way, the data request passes to and from the server cluster through the same distributed server, thereby providing symmetric communication. This operation is represented by the flow diagram box numbered 2012.

Finally, in an optimization step, the authoritative node sends forwarding information to the default reply node. The default reply node stores this information, which indicates the node to which the authoritative node forwarded the reply for symmetric communication. On subsequent reply messages received at the default reply node, the distributed server of the default reply node will know which server should receive the reply message, and will directly forward the reply message to that node. Thus, the default reply node can skip the step of sending the reply message to the authoritative node. This operation is represented by the flow diagram box numbered 2014.

Figure 21:
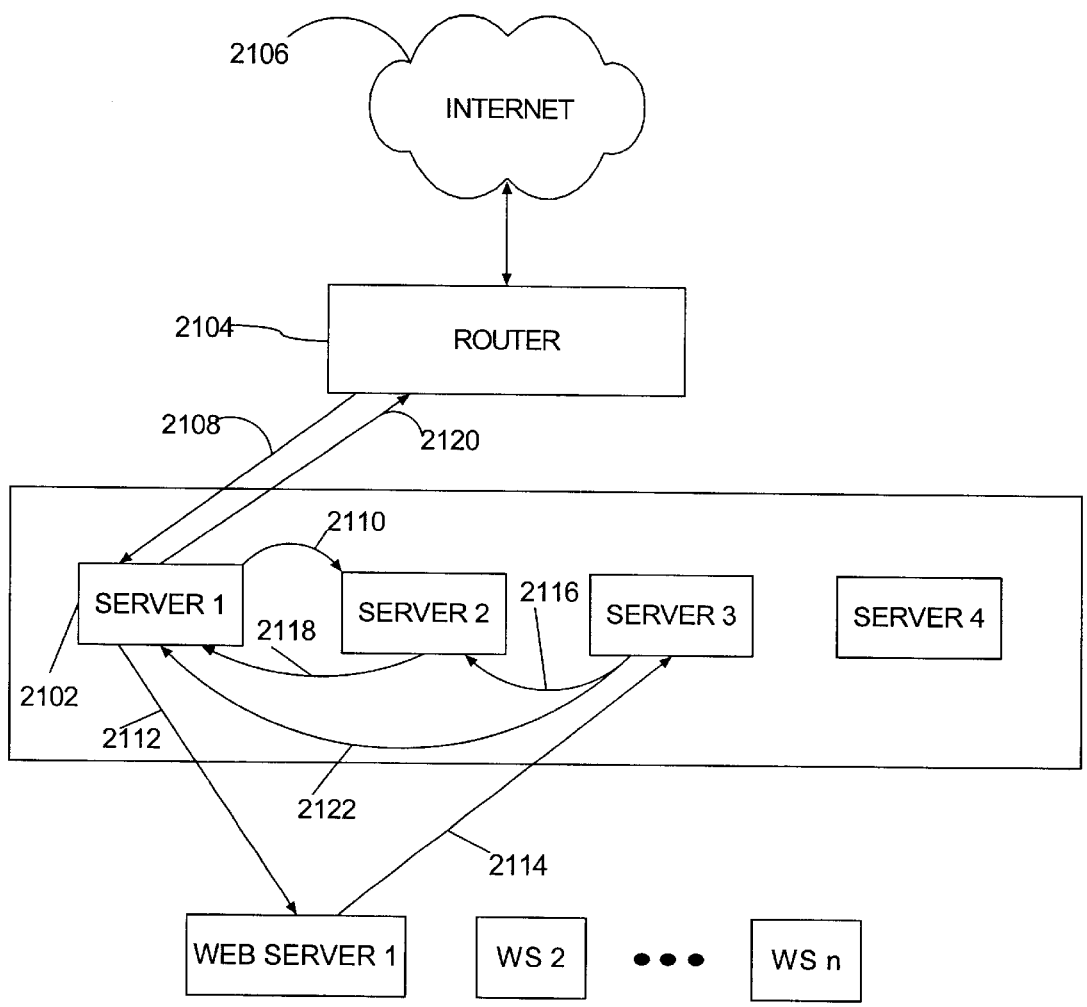
FIG. 21 is a schematic block diagram that illustrates the data traffic in the server cluster operation according to FIG. 20.

FIG. 21 diagrammatically illustrates the operation described in connection with FIG. 20. A server cluster 2102 receives data requests from a router 2104 that interfaces to the Internet 2106. The data request is received at Server 1 of the server cluster, in accordance with IP address assignments and operation of the cluster, as indicated by the data path 2108. The receiving node Server 1 hashes the request to the authoritative node, which in this example is Server 2, as indicated by the arrow 2110. The authoritative node determines the Web server that will handle the data request, and the data request is then forwarded to Web Server 1, which is the destination Web server. In the preferred embodiment, the authoritative server informs the receiving node Server 1, which forwards the data request. This processing is represented by the data path 2112.

The sequence 2110 corresponds to the box 2002 of the FIG. 20 flow diagram, and the sequence 2112 corresponds to box 2004 and box 2006 of FIG. 20.

The reply message is sent from Web Server 1 to the default reply node for Web Server 1, which in this example is Server 3 of the server cluster. The default reply data path is represented by the arrow 2114 (corresponding to box 2008 of FIG. 20). At the default reply node (Server 3), the reply node hashes the reply message to determine that the authoritative reply node for this message is Server 2, and then forwards the reply to Server 2. The forwarding operation is indicated by the arrow 2116. Finally, Server 2 forwards the reply to Server 1, which is the node needed to ensure symmetric operation of the cluster, in the operation represented by the arrow 2118. Server 1 then sends the reply back to the requesting client, through the router 2104, per the path 2120.

The operation of 2116 corresponds to the operation of the FIG. 20 box 2010, and the operation of 2118 corresponds to the FIG. 20 flow diagram box numbered 2012.

In the optimization step, Server 2, the authorization reply node, informs Server 3, the default reply node, that the server ultimately returning the reply message is Server 1. Therefore, Server 3 will store this information and send reply messages from Web Server 1 directly to Server 1, bypassing an intermediate step. This processing is indicated by the arrow 2122 (and corresponds to the FIG. 20 box 2014).

The authoritative servers can, if desired, perform load balancing operations in accordance with well-known techniques for adjusting load among the servers. Both the receiving node and the handling node will cache the assignment data that are provided by the authoritative nodes. The technique described above for the symmetric routing can be applied to a variety of server functions, such as server NAT described above. Such symmetric load balancing capability is advantageous because some server functions, such as server NAT and firewalls, may change certain IP address and port settings, which may result in changed hashing values. The operation as described above can be used to detect connection changes (detecting as changes to client or server 1P address and port, or changes to protocol type) and then to restore symmetry.

The present invention has been described above in terms of a presently preferred embodiment so that an understanding of the present invention can be conveyed. There are, however, many configurations for network traffic analysis systems not specifically described herein but with which the present invention is applicable. The present invention should therefore not be seen as limited to the particular embodiments described herein, but rather, it should be understood that the present invention has wide applicability with respect to network traffic analysis generally. All modifications, variations, or equivalent arrangements and implementations that are within the scope of the attached claims should therefore be considered within the scope of the invention.

We claim:

1. A method of operating a server computer for controlling data traffic of a computer network, the method comprising:

receiving network data traffic through a network interface that permits communication between the server computer and other computers;

communicating with a plurality of server computers that are all members of a first subnet of network addresses over which network data is sent and received, through a front layer of servers, wherein the communication includes state sharing information with a dynamic reconfiguration protocol that permits reassignment of network addresses among the front layer servers and specifies state information sharing and load information sharing among the front layer servers;

communicating with a plurality of network computers that are members of a second subnet of network addresses to send anal receive network data traffic;

determining if the data traffic is associated with a previous network communication session of an original server computer of the first subnet, prior to a network address reassignment for the original server computer;

responding to data traffic not associated with the previous network communications session of an original server computer by processing the data traffic; and responding to data traffic that is associated with the previous network communication session with an original server computer by checking a record of network address assignments and identifying the original server computer associated with the previous network communications session and forwarding the data traffic to the identified original server computer.

2. A method as defined in claim 1, wherein communicating with a plurality of server computers comprises sending data using a Reliable Message layer scheme that comprises a token data packet and one or more data carriage packets, wherein the token data packet specifies the number of data carriage packets that together comprise a Reliable Message packet and wherein the data carriage packets include data relating to state information and data traffic load information about each of the front layer servers.

3. A method as defined in claim 1, wherein communicating with server computers of the first subnet further includes performing a network address translation comprising:

receiving data traffic for a pool of virtual network addresses serviced by the server computers of the first subnet;

determining that the received data traffic includes a data packet intended for a port connection at a different server computer of the first subnet; and identifying a computer port assignment of the different server computer in the first subnet for which the data traffic is intended and performing an address translation function to route the data packet to the different server computer.

4. A method as defined in claim 3, wherein determining a port connection of the received data traffic comprises determining that the data packet relates to a port connection that is not in a list of port connections, and wherein identifying a port assignment comprises receiving a synchronization message update containing port assignment information that permits identification of the different server computer to which the port is assigned.

5. A method as defined in claim 1, further including:

receiving cluster configuration information for operation of the server computer and adapting operation accordingly; and communicating the cluster configuration information to the other server computers of the first subnet such that the other server computers adapt their operation accordingly.

6. A method as defined in claim 1, further comprising:
receiving data traffic comprising a request for a data file;
sending a data packet with the request information to a computer of the second subnet;
storing header information for the data request;
receiving data packets of the requested data file from the second subnet computer and forwarding the data packets to the requesting computer;
maintaining state data on the client communications session, including the number of data packets sent to the requesting computer;
detecting a failure of the second subnet computer and in response identifying a replacement second subnet computer from which the requested data is available; and
sending a request for the requested data to the replacement second subnet computer, such that the request is for data beginning subsequent to the data packets already forwarded to the requesting computer.

7. A method as defined in claim 1, further including operating as an authoritative node of the first subnet to ensure symmetric routing of network data traffic to and from the first subnet.

8. A method as defined in claim 7, wherein operating to ensure symmetric traffic routing comprises:
receiving a data request from a responding server computer of the first subnet, wherein the data request was initially received at the responding server computer, which determined the authoritative node for responding to the data request;
identifying a server computer in the first subnet that will handle the data traffic associated with the data request and forwarding the data request to the Identified server computer for handling;
receiving a reply message from a server computer of the first subnet that is operating as a default reply node to a second subnet computer that is responding to the data request; and
forwarding the reply message to a server computer of the first subnet that will ensure symmetric routing of the data request and reply message with respect to the server computers of the first subnet.

9. A method as defined in claim 8, further comprising forwarding assignment information to the server computer of the first subnet that was operating as the default reply node for the data request, wherein the assignment information includes forwarding information that the default reply node can use to directly forward response messages from the second subnet computer to the first subnet computer that will ensure symmetric routing.

10. A method as defined in claim 1, wherein the computers of the second subnet comprise application servers.

11. A method as defined in claim 1, wherein the network over which data traffic is received comprises the Internet.

12. A method as defined in claim 11, wherein the network data traffic includes requests for data files.

13. A method as defined in claim 12, wherein the data files comprise Web pages.

14. A method as defined in claim 1, further including:
configuring an operating system of the server computer such that all network addresses in a pool of addresses assigned to the original server computers of the first subnet are assigned to the server computer;
generating a gratuitous address resolution protocol (ARP) message in response to an address reassignment of the server computer and communicating the ARP message to the other server computers of the first subnet; and blocking a sending of an ARP acknowledgment message to the other server computers of the first subnet for any received gratuitous ARP message, thereby inhibiting reboot operation of the respective server computers and ensuring that each server computer is unaware of any duplicate assignment of network address numbers.

15. A program product for use in a computer that executes program steps recorded in a computer-readable media to perform a method of operating the computer for controlling data traffic of a computer network the: program product comprising:

a recordable media;

computer-readable instructions recorded on the recordable media, comprising instructions executable by the computer to perform a method comprising:

receiving network data traffic through a network interface that permits communication between the server computer and other computers;

communicating with a plurality of server computers that are all members of a first subnet of network addresses over which network data is sent and received, through a front layer of servers, wherein the communication includes state sharing information with a dynamic configuration protocol that permits reassignment of network addresses among the front layer servers and specifies state information sharing and load information sharing among the front layer servers;

communicating with a plurality of network computers that are members of a second subnet of network addresses to send and receive network data traffic;

determining if the data traffic is associated with a previous network communication session of an original server computer of the first subnet, prior to a network address reassignment for the original server computer;

responding to data traffic not associated with the previous network communications session of an original server computer by processing the data traffic; and responding to data traffic that is associated with the previous network communication session with an original server computer by checking a record of network address assignments and identifying the original server computer associated with the previous network communications session and forwarding the data traffic to the identified original server computer.

16. A program product as defined in claim 15, wherein communicating with a plurality of server computers comprises sending data using a Reliable Message layer scheme that comprises a token data packet and one or more data carriage packets, wherein the token data packet specifies the number of data carriage packets that together comprise a Reliable Message packet and wherein the data carriage packets include data relating to state information and data traffic load information about each of the front layer servers.

17. A program product as defined in claim 15, wherein the performed method further comprises:

receiving network data traffic;

determining if the data traffic is associated with a previous network communication session of an original server computer of the first subnet, prior to a network address reassignment for the original server computer;

responding to data traffic not associated with a previous network communications session of an original server computer by processing the data traffic; and responding to data traffic that is associated with a previous network communication session with an original server computer by checking a record of network address assignments and Identifying the original server computer associated with the previous network communications session and forwarding the data traffic to the identified original server computer.

18. A program product as defined in claim 15, wherein communicating with server computers of the first subnet further includes performing a network address translation comprising:

receiving data traffic for a pool of virtual network addresses serviced by the server computers of the first subnet;

determining that the received data traffic includes a data packet intended for a port connection at a different server computer of the first subnet; and identifying a computer port assignment of the different server computer in the first subnet for which the data traffic is intended and performing an address translation function to route the data packet to the different server computer.

19. A program product as defined in claim 18, wherein determining a port connection of the received data traffic comprises determining that the data packet relates to a port connection that is not in a list of port connections, and wherein identifying a port assignment comprises receiving a synchronization message update containing port assignment information that permits identification of the different server computer to which the port is assigned.

20. A program product as defined in claim 15, wherein the performed method further comprises:

receiving data traffic comprising a request for a data file;

sending a data packet with the request information to a computer of the second subnet;

storing header information for the data request;

receiving data packets of the requested data file from the second subnet computer and forwarding the data packets to the requesting computer;

maintaining state data on the client communications session, including the number of data packets sent to the requesting computer;

detecting a failure of the second subnet computer and in response identifying a replacement second subnet computer from which the requested data is available; and sending a request for the requested data to the replacement second subnet computer, such that the request is for data beginning subsequent to the data packets already forwarded to the requesting computer.

21. A program product as defined in claim 15, wherein the performed method further includes:

configuring an operating system of the server computer such that all network addresses in a pool of addresses assigned to the server computers of the first subnet are assigned to the server computer;

generating a gratuitous address resolution protocol (ARP) message in response to an address reassignment of the server computer and communicating the ARP message to the other server computers of the first subnet;

blocking the sending of an ARP acknowledgment message to the other server computers of the first subnet for any received gratuitous ARP message, thereby inhibiting reboot operation of the respective server computers and ensuring that each server computer is unaware of any duplicate assignment of network address numbers.

22. A program product as defined in claim 15, wherein the performed method further includes operating as an authoritative node of the first subnet to ensure symmetric routing of network data traffic to and from the first subnet.

23. A program product as defined in claim 22, wherein operating to ensure symmetric traffic routing comprises:

receiving a data request from a responding server computer of the first subnet, wherein the data request was initially received at the responding server computer, which determined the authoritative node for responding to the data request;

identifying a server computer in the first subnet that will handle the data traffic associated with the data request and forwarding the data request to the identified server computer for handling;

receiving a reply message from a server computer of the first subnet that is operating as a default reply node to a second subnet computer that is responding to the data request; and forwarding the reply message to a server computer of the first subnet that will ensure symmetric routing of the data request and reply message with respect to the server computers of the first subnet.

24. A program product as defined in claim 23, wherein the performed method further comprises forwarding assignment information to the server computer of the first subnet that was operating as the default reply node for the data request, wherein the assignment information includes forwarding information that the default reply node can use to directly forward response messages from the second subnet computer to the first subnet computer that Will ensure symmetric routing.

25. A program product as defined in claim 15, wherein the computers of the second subnet comprise application servers.

26. A network server computer comprising:

a network interface that permits communication between the server computer and other computers;

a distributed server application executed by the server computer that thereby permits the server computer to communicate with a plurality of server computers that are all members of a first subnet of network addresses over which network data is sent and received, through a front layer of servers, wherein the communication includes state sharing information with a dynamic reconfiguration protocol that permits reassignment of network addresses among the front layer servers and specifies state information sharing and load information sharing among the front layer servers, and permits the server computer to communicate with a plurality of network computers that are members of a second subnet of network addresses to send and receive network data traffic and determine if the data traffic is associated with a previous network communication session of an original server computer of the first subnet, prior to a network address reassignment for the original server computer;

respond to data traffic not associated with the previous network communications session of an original server computer by processing the data traffic; and respond to data traffic that is associated with the previous network communication session with an original server computer by checking a record of network address assignments and identifying the original server computer associated with the previous network communications session and forwarding the data traffic to the identified original server computer.

27. A program product as defined in claim 15, wherein the performed method further includes:

receiving cluster configuration information for operation of the server computer and adapting operation accordingly; and communicating the cluster configuration information to the other server computers of the first subnet such that the other server computers adapt their operation accordingly.

* * * * *